(12) United States Patent
Pupakdee et al.

(10) Patent No.: US 11,716,774 B2
(45) Date of Patent: Aug. 1, 2023

(54) DEVICE PAIRING SYSTEM AND METHOD, AND DEVICE COMMUNICATION CONTROL SYSTEM AND METHOD

(71) Applicant: Nitto Denko Corporation, Osaka (JP)

(72) Inventors: Karn Pupakdee, Bangkok (TH); Adisak Srisuriyasavad, Bangkok (TH); Jugkree Na Ayutthaya Plalakawong, Bangkok (TH); Suwan Boonprem, Bangkok (TH); Suppasit Chuwatsawat, Bangkok (TH); Shoko Trepetch, Bangkok (TH); Austin Phillips, Melbourne (AU)

(73) Assignee: Nitto Denko Corporation

( * ) Notice: Subject to any disclaimer, the term of this patent is extended or adjusted under 35 U.S.C. 154(b) by 0 days.

(21) Appl. No.: 16/977,690

(22) PCT Filed: Feb. 28, 2019

(86) PCT No.: PCT/SG2019/050113
§ 371 (c)(1),
(2) Date: Sep. 2, 2020

(87) PCT Pub. No.: WO2019/168476
PCT Pub. Date: Sep. 6, 2019

(65) Prior Publication Data
US 2021/0045169 A1    Feb. 11, 2021

(30) Foreign Application Priority Data

Mar. 2, 2018 (SG) .......................... 10201801797Q

(51) Int. Cl.
*H04B 7/00* (2006.01)
*H04W 76/11* (2018.01)
(Continued)

(52) U.S. Cl.
CPC ............ *H04W 76/11* (2018.02); *H04W 48/16* (2013.01); *H04W 64/00* (2013.01)

(58) Field of Classification Search
CPC ...... H04W 76/11; H04W 48/16; H04W 64/00
(Continued)

(56) References Cited

U.S. PATENT DOCUMENTS 7,626,963 B2 * 12/2009 Patel .................. H04L 63/0892
                                                                455/433
8,422,428 B1 *  4/2013 Hilyard ................. H04W 12/06
                                                                370/328
(Continued)

FOREIGN PATENT DOCUMENTS

CN    106230587 A    12/2016
EP      2852122 A1    3/2015
JP    2017192117 A   10/2017

OTHER PUBLICATIONS

International Search Report for Application No. PCT/SG2019/050113 dated May 15, 2019, 2 pages.
(Continued)

*Primary Examiner* — April G Gonzales
(74) *Attorney, Agent, or Firm* — Lerner David LLP

(57) ABSTRACT

In a described embodiment, a device pairing method is disclosed. The device pairing method comprises: generating, using a server (130), a user pairing identifier corresponding to a user profile; sending, using the server (130), the generated user pairing identifier for use by a first user device (110) of the user profile to pair a second user device (120) with the user profile. In another described embodiment, a device communication control method is disclosed. The method comprises: sending, using a challenging computing device (120) to a responding computing device (110), a random number and an associated key identifier; controlling communication based on a result of comparison of the
(Continued)

response and verification HMAC values computed with the random number and one of a plurality of cryptographic keys identified by the key identifier.

16 Claims, 12 Drawing Sheets

(51) Int. Cl.
*H04W 48/16* (2009.01)
*H04W 64/00* (2009.01)

(58) Field of Classification Search
USPC ........................................................ 455/41.2
See application file for complete search history.

(56) References Cited

U.S. PATENT DOCUMENTS

| | | | | |
|---|---|---|---|---|
| 8,644,515 | B2* | 2/2014 | Ho | H04L 9/0844 |
| | | | | 380/278 |
| 9,757,065 | B1* | 9/2017 | Suri | A61B 1/247 |
| 9,848,075 | B1* | 12/2017 | Ahmad | G16H 40/67 |
| 2006/0173974 | A1* | 8/2006 | Tang | H04L 63/08 |
| | | | | 709/225 |
| 2008/0076419 | A1* | 3/2008 | Khetawat | H04L 41/0806 |
| | | | | 370/328 |
| 2012/0214416 | A1* | 8/2012 | Kent | H04W 4/021 |
| | | | | 455/41.2 |
| 2012/0322376 | A1* | 12/2012 | Couse | H04M 1/72412 |
| | | | | 455/41.2 |
| 2013/0217332 | A1* | 8/2013 | Altman | G06Q 20/3224 |
| | | | | 455/3.01 |
| 2013/0217333 | A1* | 8/2013 | Sprigg | G06Q 30/02 |
| | | | | 455/41.2 |
| 2014/0171064 | A1* | 6/2014 | Das | H04W 84/18 |
| | | | | 455/426.1 |
| 2015/0180671 | A1* | 6/2015 | Yamashita | H04L 9/3242 |
| | | | | 713/168 |
| 2016/0339176 | A1* | 11/2016 | Shapley | G16H 40/67 |
| 2017/0013104 | A1* | 1/2017 | Iinuma | H04B 1/385 |
| 2017/0013342 | A1* | 1/2017 | Watson | H04W 12/04 |
| 2017/0303119 | A1* | 10/2017 | Ogura | H04W 12/03 |

OTHER PUBLICATIONS

Extended European Search Report including Written Opinion for Application No. 19760012.5 dated Sep. 29, 2021, pp. 1-15.

* cited by examiner

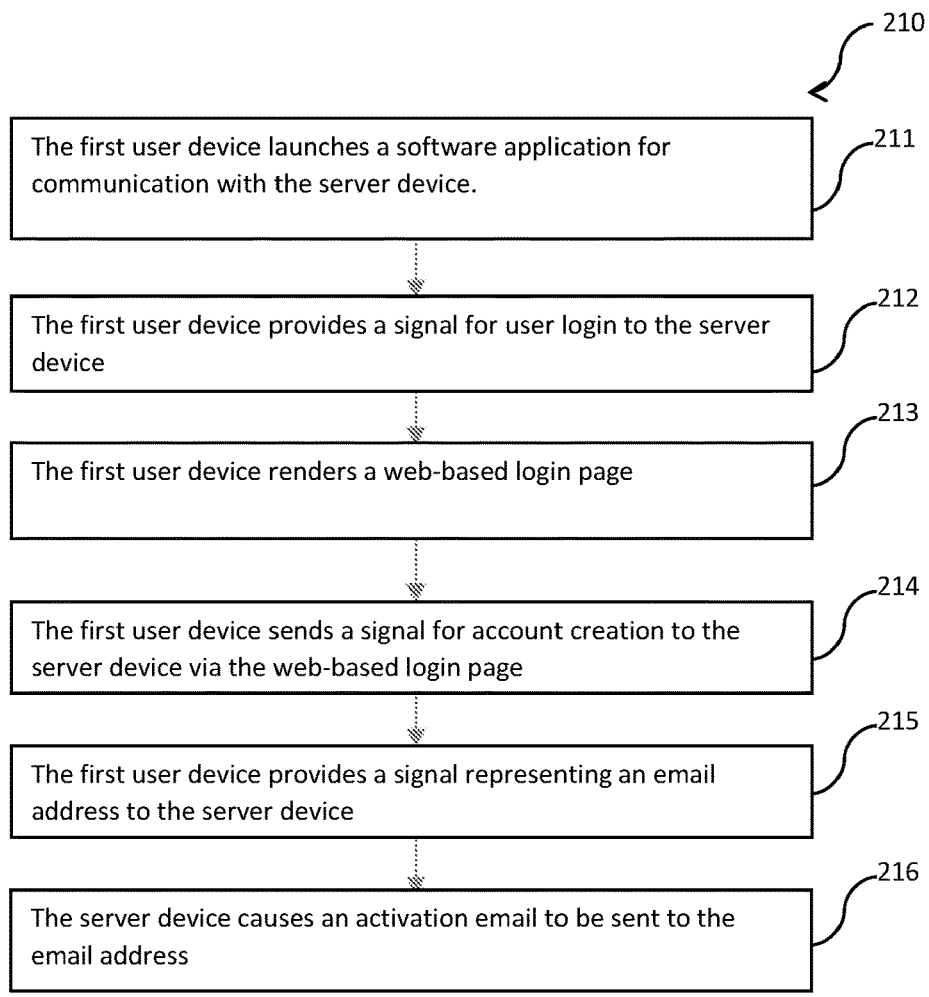
Figure 2A(1)
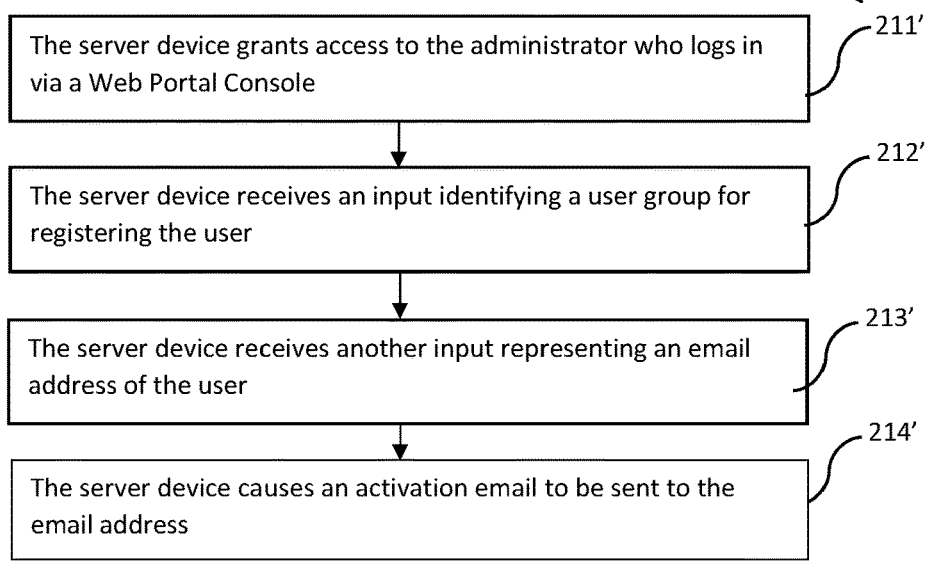
Figure 2A(2)

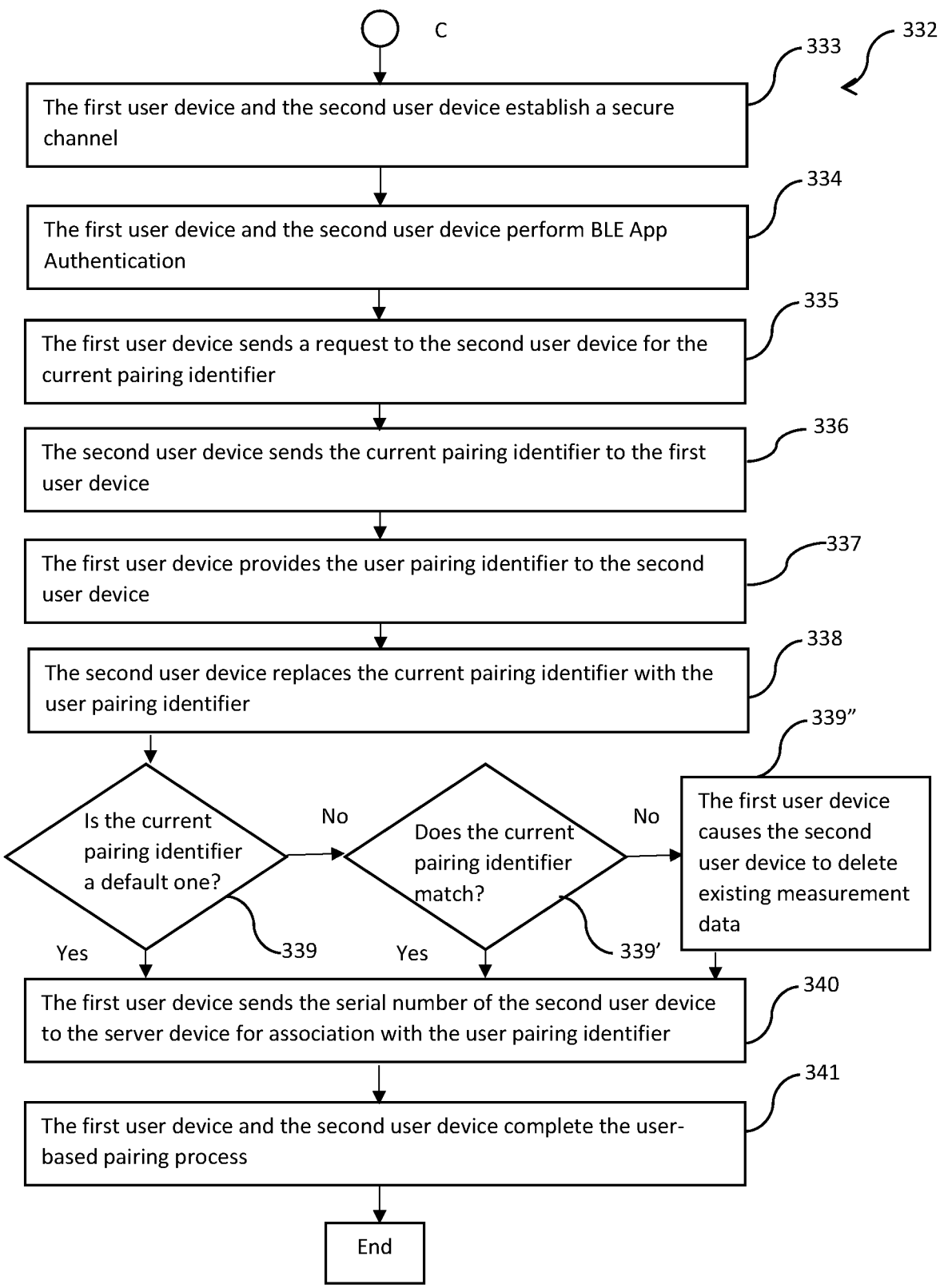
Figure 3C(1)

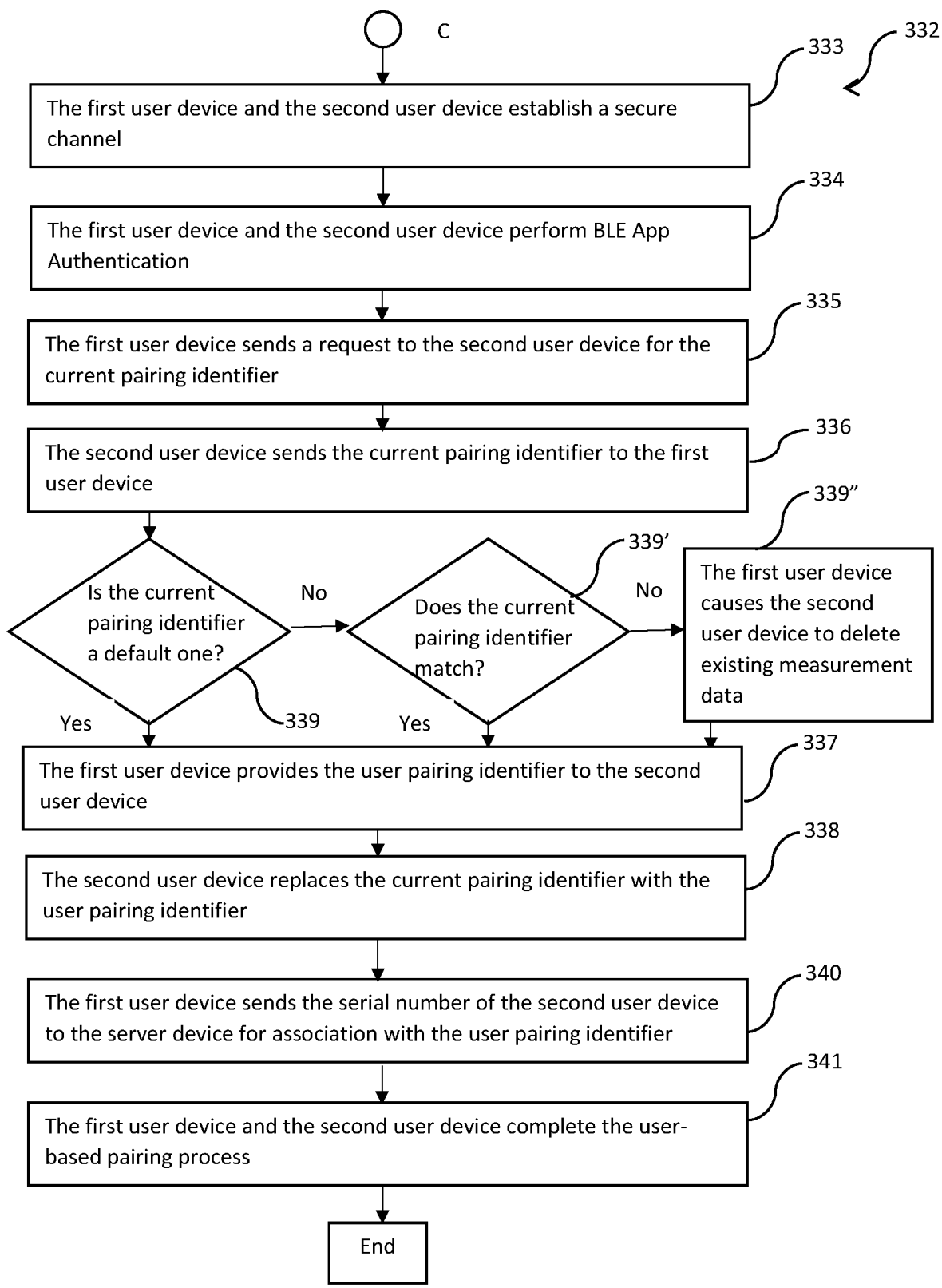
Figure 3C(2)

DEVICE PAIRING SYSTEM AND METHOD, AND DEVICE COMMUNICATION CONTROL SYSTEM AND METHOD

CROSS REFERENCE TO RELATED APPLICATIONS

The present application is a national phase entry under 35 U.S.C. § 371 of International Application No. PCT/SG2019/050113, filed Feb. 28, 2019, which claims priority from Singapore Application No. 10201801797Q, filed Mar. 2, 2018, all of which are incorporated herein by reference.

TECHNICAL FIELD

The present disclosure relates to pairing of user devices and device communication control, more particularly to pairing of user devices based on a server-generated user pairing identifier and HMAC-based device communication control.

BACKGROUND

Nowadays, it is quite common for a user to own multiple devices with wireless connectivity. Such devices may include wearable devices suitable for monitoring physiological conditions, which provides an indication of wellness as well as mental and physical states of the wearer. Communication of such physiological data between the devices should be secured to prevent theft or leakage of confidential data.

Techniques for securement of transmission includes pairing two wireless devices prior to any data transmission. Typically, such devices are pre-installed with applications or operating systems operable for device pairing. Such operations include, for example, device discovery, device selection and connection setup.

In a scenario involving a Bluetooth-enabled monitoring device (e.g., an activity tracker) and a Bluetooth-enabled computing device (e.g., a smartphone), the monitoring device operating in an advertising mode broadcasts advertising packets for detection by the computing device operating in a scanning mode. Upon detection of the advertising packets and in response to a corresponding user operation, the computing device responds with a connection request. The advertising packets, or advertising channel packet data units (PDUs), may include identifier information such as a media access control (MAC) address and a universal unique identifier (UUID).

The pairing process is followed by a bonding process, which involves storing a key (shared secret key) in the monitoring device and the computing device for authentication in subsequent connection establishment therebetween. Thereafter, upon a subsequent connection request by a requesting device, the key is used by one of the computing device and the monitoring device to authenticate the requesting device. Where the requesting device is determined to be the other of the computing device and the monitoring device, a connection is established between the computing device and the monitoring device without the need for any user action or another pairing process. In such a manner, the pairing and bonding processes facilitate connection establishment between such devices, especially those frequently used, in a somewhat user-friendly way. However, the aforementioned approach suffers from numerous drawbacks.

For example, an unauthorized user may gain access to user data belonging to another user and stored on the monitoring device. More specifically, the unauthorized user may gain full control of the user data and may potentially impersonate the another user once the unauthorized user pairs his or her computing device with the monitoring device. Further, in an environment involving multiple users associated with respective computing devices and respective paired wearable devices for monitoring physiological states, there is a risk that physiological data generated and transmitted by each wearable device is received by the computing device of the wrong user (i.e., a user not corresponding to the wearable device).

Additionally, once a computing device is paired with a monitoring device, all software applications installed on the computing device may have access to data stored on the monitoring device. Moreover, where the computing device is shared by a number of users and the paired monitoring device belongs to one of the users, other ones of the users may be able to access data stored on the monitoring device via the computing device.

Furthermore, with existing arrangements, reliable, secure communication between the monitoring device and the computing device cannot be achieved without excessive battery consumption in the events of incorrect communication cycles (e.g., unsuccessful connection). Moreover, an untrusted third party application installed on the computing device, especially a malicious one, may communicate with the monitoring device in a manner which would result in the monitoring device being incorrectly configured and the theft of user data.

Thus, it is desirable to provide a device pairing system, a device pairing method, a device communication control system and a device communication control method, which address at least one of the drawbacks of the prior art or to provide the public with a useful choice.

SUMMARY

According to one aspect, there is provided a device pairing method comprising: generating, using a server, a user pairing identifier corresponding to a user profile; sending, using the server, the generated user pairing identifier for use by a first user device of the user profile to pair a second user device with the user profile; and receiving, using the server, device information of the second user device.

The described embodiment is particularly advantageous. For example, a user-device pairing relationship can be established between the user profile and the second user device, which reduces the risks of data leakage or theft, as well as the risks of user devices being paired incorrectly.

It may be that the method further comprises: sending, using the first user device, the user pairing identifier to the second user device for replacement of a current pairing identifier of the second user device. This establishes, at the second user device, a correspondence relationship with the user profile. The method may further comprise: sending, using the first user device, a signal to the second user device to cause the second user device to erase user related data of the second user device if the replaced current pairing identifier represents a non-default pairing identifier and is different from the user pairing identifier. This is particularly advantageous. For example, if the current pairing identifier of the second user device is not a default one and does not match the user pairing identifier, it means that the second user device belongs to and probably stores user related data of another user. By causing the second user device to erase the user related data of another user, it is possible to ensure that such user related data belonging to one user and stored on the second user device is not accessible by another user who does not have the matching user pairing identifier. This is also advantageous in that it prevents user related data of a current user stored on the second user device from being associated with a user profile of a next user to be user-device paired with the second user device.

Preferably, the method may further comprise enabling communication of the first user device with the second user device if the first user device satisfies a predetermined condition relating to at least one of a geographic location and a time period. This is useful in that the first user device may be enabled to communicate with the second user device (e.g., for the purpose of pairing the second user device with the user profile) if the first user device meets the predetermined condition. The predetermined condition can be set by a service provider to ensure that such a pairing operation is performed under certain conditions (e.g., at a location and within certain time period where such a pairing operation can be safely performed).

The method may further comprise: sending, using the second user device to the first user device, a random number and an associated key identifier, receiving, using the second user device from the first user device, a response hash-based message authentication code (HMAC) value, computing, using the second user device, a verification HMAC value with the random number and one of a plurality of cryptographic keys of the second user device identified by the key identifier, and controlling, using the second user device, communication of the second user device with the first user device based on a result of comparison of the response and verification HMAC values. This is useful in preventing data theft and device misconfiguration. In the described embodiment, the second user device communicates with the first user device only if the HMAC values match. Without the right cryptographic key, another computing device is unable to calculate the right response HMAC value and thus its communication and/or connection with the second user device will be disregarded and disconnected by the second user device, respectively. Safety of the second user device is thus improved.

The second user device may be controlled to disconnect an existing connection with the first user device if the result of comparison indicates that the response and verification HMAC values do not match. The second user device may be controlled to disregard communication from the first user device if the result of comparison indicates that the response and verification HMAC values do not match.

It is preferred that the method may further comprise generating, using the second user device, the random number.

The method may further comprise: generating, using the first user device, the response HMAC value with the random number and one of a plurality of cryptographic keys of the first user device identified by the key identifier.

The user pairing identifier may preferably include a unique combination of at least one of a number, an alphabet, and a character.

The server may send the generated user pairing identifier through the Internet.

The device information may be received by the server from the first user device. This device information may be provided to the server by any other means. The device information may include a serial number.

According to another aspect, there is provided a device pairing system comprising: a server configured to: generating a user pairing identifier corresponding to a user profile; sending the generated user pairing identifier for use by a first user device of the user profile to pair a second user device with the user profile; and receiving device information of the second user device.

The device pairing system may further comprise the first user device. The first user device may be configured to: send the user pairing identifier to the second user device for replacement of a current pairing identifier of the second user device. The first user device may be further configured to: send a signal to the second user device to cause the second user device to erase user related data of the second user device if the replaced current pairing identifier represents a non-default pairing identifier and is different from the user pairing identifier. Further, communication of the first user device with the second user device may be enabled if the first user device satisfies a predetermined condition relating to at least one of a geographic location and a time period.

The device pairing system may further comprise the second user device. The second user device may be configured to: send, to the first user device, a random number and an associated key identifier, receive, from the first user device, a response hash-based message authentication code (HMAC) value, compute a verification HMAC value with the random number and one of a plurality of cryptographic keys of the second user device identified by the key identifier, and control communication of the second user device with the first user device based on a result of comparison of the response and verification HMAC values. The second user device may be controlled to disconnect an existing connection with the first user device if the result of comparison indicates that the response and verification HMAC values do not match. The second user device may be controlled to disregard communication from the first user device if the result of comparison indicates that the response and verification HMAC values do not match. The second user device may be further configured to: generate the random number.

The first user device may be configured to generate the response HMAC value with the random number and one of a plurality of cryptographic keys of the first user device identified by the key identifier.

The user pairing identifier may include a unique combination of at least one of a number, an alphabet, and a character. The server may send the generated user pairing identifier through the Internet. The device information may be received by the server from the first user device. The device information may include a serial number.

According to another aspect, there is provided a device pairing method comprising: using, by a user device, an associated user pairing identifier to pair another user device with a user profile of the user pairing identifier, the user pairing identifier being generated by a server.

The method may further comprise sending, using the user device, the user pairing identifier to the another user device for replacement of a current pairing identifier of the another user device. It is preferred that the method may further comprise: sending, using the user device, a signal to the another user device to cause the another user device to erase user related data of the another user device if the replaced current pairing identifier represents a non-default pairing identifier and is different from the user pairing identifier.

The method may further comprise: enabling communication of the user device with the another user device if the user device satisfies a predetermined condition relating to at least one of a geographic location and a time period.

Preferably, the method may further comprise: sending, using the another user device to the user device, a random number and an associated key identifier, receiving, using the another user device from the user device, a response hash-based message authentication code (HMAC) value, computing, using the another user device, a verification HMAC value with the random number and one of a plurality of cryptographic keys of the another user device identified by the key identifier, and controlling, using the another user device, communication of the another user device with the user device based on a result of comparison of the response and verification HMAC values.

The another user device may be controlled to disconnect an existing connection with the user device if the result of comparison indicates that the response and verification HMAC values do not match. The another user device may be controlled to disregard communication from the user device if the result of comparison indicates that the response and verification HMAC values do not match. The method may further comprise: generating, using the another user device, the random number. Preferably, the method may further comprise: generating, using the user device, the response HMAC value with the random number and one of a plurality of cryptographic keys of the user device identified by the key identifier.

The user pairing identifier may include a unique combination of at least one of a number, an alphabet, and a character. The method may further comprise: receiving, using the user device, the user pairing identifier from the server through the Internet. The method may further comprise: sending, using the user device, device information of the another user device to the server. The device information may include a serial number.

According to another aspect, there is provided a device communication control method comprising: sending, using a challenging computing device to a responding computing device, a random number and an associated key identifier; receiving, using the challenging computing device from the responding computing device, a response hash-based message authentication code (HMAC) value; computing, using the challenging computing device, a verification HMAC value with the random number and one of a plurality of cryptographic keys of the challenging computing device identified by the key identifier; and controlling, using the challenging computing device, communication of the challenging computing device with the responding computing device based on a result of comparison of the response and verification HMAC values.

The challenging computing device may be controlled to disconnect an existing connection with the responding computing device if the result of comparison indicates that the response and verification HMAC values do not match. The challenging computing device may be controlled to disregard communication from the responding computing device if the result of comparison indicates that the response and verification HMAC values do not match. The method may further comprise: generating, using the challenging computing device, the random number. The method may further comprise: generating, using the responding computing device, the response HMAC value with the random number and one of a plurality of cryptographic keys of the responding computing device identified by the key identifier.

According to another aspect, there is provided a device pairing system comprising: a user device configured to: use an associated user pairing identifier to pair another user device with a user profile of the user pairing identifier, the user pairing identifier being generated by a server.

The user device may preferably be further configured to: send the user pairing identifier to the another user device for replacement of a current pairing identifier of the another user device. The user device may be further configured to: send a signal to the another user device to cause the another user device to erase user related data of the another user device if the replaced current pairing identifier represents a non-default pairing identifier and is different from the user pairing identifier. It is preferred that communication of the user device with the another user device may be enabled if the user device satisfies a predetermined condition relating to at least one of a geographic location and a time period.

The device pairing system may further comprise the another user device. The another user device may be configured to: send, to the user device, a random number and an associated key identifier, receive, from the user device, a response hash-based message authentication code (HMAC) value, compute a verification HMAC value with the random number and one of a plurality of cryptographic keys of the another user device identified by the key identifier, and control communication of the another user device with the user device based on a result of comparison of the response and verification HMAC values.

The another user device may be controlled to disconnect an existing connection with the user device if the result of comparison indicates that the response and verification HMAC values do not match. The another user device may be controlled to disregard communication from the user device if the result of comparison indicates that the response and verification HMAC values do not match. The another user device may be further configured to generate the random number. The user device may be further configured to: generate the response HMAC value with the random number and one of a plurality of cryptographic keys of the user device identified by the key identifier.

The user pairing identifier may include a unique combination of at least one of a number, an alphabet, and a character. The user device may further be configured to receive the user pairing identifier from the server through the Internet. The user device may be further configured to send device information of the another user device to the server. The device information may include a serial number.

According to another aspect, there is provided a device communication control system comprising: a challenging computing device configured to: send, to a responding computing device, a random number and an associated key identifier, receive, from the responding computing device, a response hash-based message authentication code (HMAC) value, compute a verification HMAC value with the random number and one of a plurality of cryptographic keys of the challenging computing device identified by the key identifier, and control communication of the challenging computing device with the responding computing device based on a result of comparison of the response and verification HMAC values.

The challenging computing device may be configured to disconnect an existing connection with the responding computing device if the result of comparison indicates that the response and verification HMAC values do not match. The challenging computing device may be configured to disregard communication from the responding computing device if the result of comparison indicates that the response and verification HMAC values do not match. The challenging computing device may be configured to generate the random number.

The device communication control system may further comprise the responding computing device. The responding computing device may be configured to: generate the response HMAC value with the random number and one of a plurality of cryptographic keys of the responding computing device identified by the key identifier.

According to another aspect, there is provided a device pairing method comprising: sending, using a server, a user pairing identifier for use by a first user device of the user profile to pair a second user device with the user profile, the user pairing identifier being generated independent of the first user device the and second user device; and receiving, using the server, device information of the second user device. This is advantageous in that, in one arrangement, the user pairing identifier may be generated independent of the user devices and then provided to the server, rather than the server generating the user pairing identifier. This is useful in reducing processing load of the server.

According to another aspect, there is provided a device pairing method comprising: using, by a user device, an associated user pairing identifier to pair another user device with a user profile of the user pairing identifier, the user pairing identifier being generated independent of the user device and the another user device.

According to another aspect, there is provided a device pairing method comprising: sending, using a first user device, a signal to a second user device to cause the second user device to erase user related data of the second user device if a current pairing identifier of the second user device represents a non-default pairing identifier and is different from a user pairing identifier, the user pairing identifier being generated by a server.

According to another aspect, there is provided a device pairing method comprising: sending, using a first user device, a signal to a second user device to cause the second user device to erase user related data of the second user device if a current pairing identifier of the second user device represents a non-default pairing identifier and is different from a user pairing identifier, the user pairing identifier being generated independent of the first user device and the second user device.

According to another aspect, there is provided a cloud-based server system for wireless communication, comprising: creating, at the cloud-based server system, a time login and a basic profiling of a user through an application residing at at least one platform, the basic profiling of a user being established with a user profile service associated with the cloud-based server system, and a user pairing identifier configured with respect to the user for pairing with a device, the user pairing identifier retrievable from the cloud-based server system; storing, at the cloud-based server system, the time login and the basic profiling of the user being established with the user profile service of the cloud-based server system; and sending, at the cloud-based server system, user based pairing information through the application residing at the at least one platform, the application being preinstalled in a mobile and/or tablet device.

The basic profiling of the user may further comprise at least one packet of user profile information comprising at least one of a height, a weight, a name, a gender, a birthday, wherein the user operatively enables or disenables the wireless communication. The wireless communication may further comprise the Internet. The user may access the cloud-based server system via at least one channel, wherein the at least one channel is positioned and located beyond reach of an unknown user. The user pairing identifier may be configured to establish pairing between the cloud-based server system and the mobile and/or tablet device and device. The user pairing identifier may be obtainable by using a plurality of link keys retrievable in at least one location separate from each other. The plurality of link keys, when combined, may provide a main link key for unlocking the device and/or the mobile and/or tablet.

The cloud-based server system may further comprise at least one connectivity portal discoverable by the mobile and/or tablet device. The system may further comprise verifying and considering, in the cloud-based server system, the user pairing identifier associated with the main link key. At least one packet of user pairing identifier information may be accessible on demand, subject to a time period. The time period may range from 1 minute to 5 minutes.

The application may be released through the Internet, with the user defining enable or disenable of the wireless communication.

According to another aspect, there is provided a method for pairing a device comprising: receiving, at an application from a cloud-based server system, user based pairing information with a user profile service in the cloud-based server system, a user pairing identifier for pairing with a device, the user pairing identifier retrievable from the cloud-based server system, the user pairing identifier for the user to authenticate with the device; storing, at an application in a mobile and/or tablet device, the user pairing information, in a bonding and user based pairing for pairing the device with the application, selecting, at the application in the mobile and/or tablet device, selectively operating the device in at least one predefined condition, the at least one predefined condition further comprising, a first predefined condition where the device connectable at a predefined time space, while the device discoverable by the application, the user operatively selecting the device; bonding, at the application in the mobile and/or tablet device, initiating to display a random number on the device operable in the first predefined condition where the device connectable at the predefined time space, while the device discoverable by the application; inputting the random number to the mobile and/or tablet device to verify and validate the device, pairing, at the application in the mobile and/or tablet device, receiving a user based pairing information from the device, a default pairing identifier for the user to authenticate the device, wherein the device using the application configured to compare a non user-based pairing identifier with the default pairing identifier through the application for authenticating the device, the default pairing identifier preinstalled in the device; comparing the default pairing identifier with the non user-based pairing identifier to authenticate the device, verifying through the application whereby the device is previously paired; requesting an application authentication for security between the mobile device and the wearable device through obtaining a challenge key from the wearable device, generating a response key through the challenge key and a public key, whereby the public key pre-installed in the mobile and/or tablet and the wearable device; sending the response key from the mobile and/or tablet device to the wearable device; verifying the response key based on the application authentication; and sending the user based pairing information to the device, the user pairing identifier retrieved from the cloud-based server system, the device.

According to another aspect, there is provided a device for wireless communication, the device comprising: sending user based pairing information to an application, whereby the user based pairing information and the application preinstalled in a mobile and/or tablet device, the application residing a default pairing identifier; receiving the user based pairing information through the application preinstalled in the mobile and/or tablet device, the application residing a user pairing identifier; and storing the user pairing identifier for the user to retrieve at a time space, for the user to authenticate the device paired with the mobile and/or tablet device.

The default pairing identifier may be at least one default factory identifier pre-set at "000000". The application may send the user pairing identifier, to overwrite and replace the default pairing identifier. The user pairing identifier may have at least one of a combination of numbers, alphabets or characters. The at least one of a combination of alphabets may be in lower or upper caps.

According to another aspect, there is provided a method of associating a first user device with a second user device, comprising: receiving, using the first user device, a pairing identifier from the second user device; determining, using the first user device, whether the received pairing identifier is a default pairing identifier, and sending, using the first user device, a pairing identifier to the second user device for replacement of the pairing identifier of the second user device if a result of determination is affirmative, wherein the pairing identifier corresponds to a user profile associated with the first user device.

The method may further comprise: causing the second user device to replace the pairing identifier thereof with the default pairing identifier if the result of determination is negative. The first user device may be a mobile device. The second user device may be a wearable device.

According to another aspect, there is provided a method of enabling user-device association, comprising: providing, using a server, to a first user device a user pairing identifier corresponding to and accessible only by the first user device in association with a user profile of the user pairing identifier, whereby association of the user profile of the first user device with a second user device is enabled by the user pairing identifier received by the first user device.

It is envisaged that features relating to one aspect may be applicable to the other aspects.

BRIEF DESCRIPTION OF THE DRAWINGS

Example embodiments will now be described hereinafter with reference to the accompanying drawings, wherein like parts are denoted by like reference numerals:

FIG. 2A(1) illustrates a first portion of an example embodiment of a method performed by the system of FIG. 1, for the creation of a user account by a user of the computing device;

FIG. 2A(2) illustrates another first portion of the method alternative to the first portion of FIG. 2A(1), performed by the system of FIG. 1, for the creation of the user account by a system administrator;

FIG. 3C(1) illustrates a sixth portion of the method performed by the system of FIG. 1, following the portion of FIG. 3B, for a process of user-device pairing of a user profile of the user with the wearable device, involving the user pairing identifier;

FIG. 3C(2) illustrates another sixth portion of the method alternative to the sixth portion of FIG. 3C(1), following the portion of FIG. 3B, for another process of user-device pairing of the user profile of the user with the wearable device, involving the user pairing identifier;

DETAILED DESCRIPTION

With reference to the figures, the present disclosure relates in one aspect to device security enhancement. It is proposed that a user-device (or user-based) pairing process (or protocol) be introduced to improve security of communications of data between devices, thereby reducing susceptibility of the system to unauthorised data access by an unknown user. The present disclosure also streamlines or facilitates the pairing process to achieve better security without requiring cumbersome operations. Mishandling of data may also be reduced.

Figure 1:
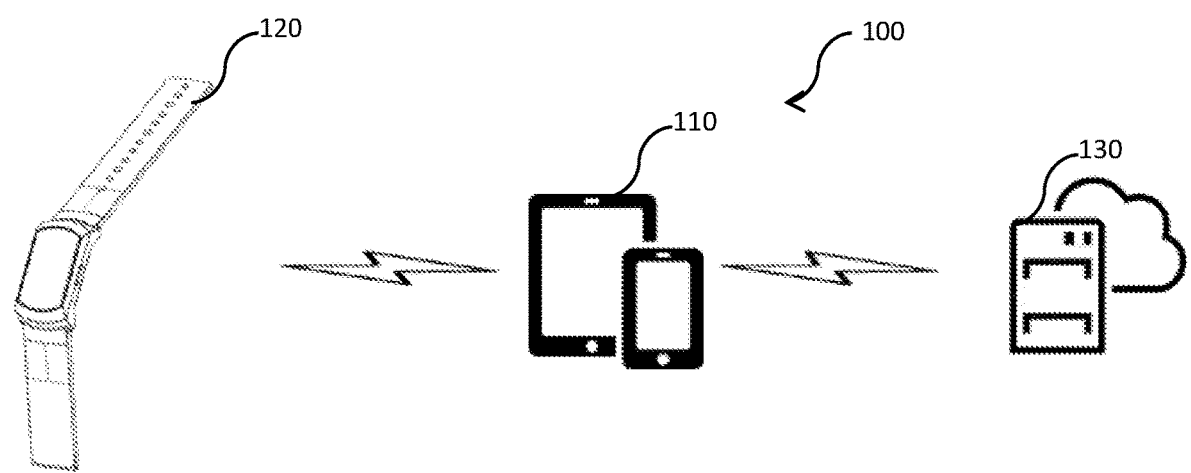
FIG. 1 shows an example embodiment of a device pairing system of the present disclosure, including a server device, a computing device and a wearable device.

FIG. 1 shows an example of a device pairing system 100 including a first user device 110 (e.g., a computing device such as a smartphone or a tablet device), a second user device 120 (e.g., a monitoring device such as a wearable device worn by a user of the first user device 110), and a server device 130 (e.g., a server device of a cloud computing system) according to one example embodiment. The system 100 is configured to perform an example embodiment of a method with portions shown in FIGS. 2, 3 and 4. In this embodiment, the first user device 110 and the second user device 120 are Bluetooth compatible. The terms "server device" and "server" as used herein have the same meaning.

Figure 5A:
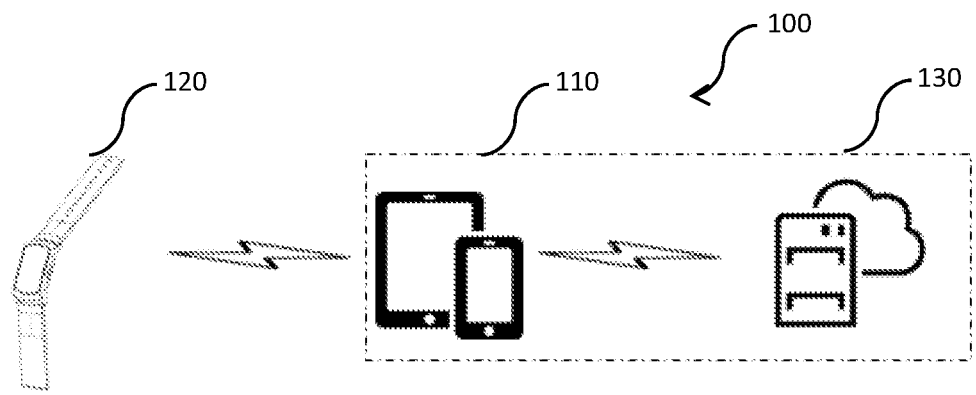
FIG. 5A illustrates the system of FIG. 1, with the computing device and the server device marked in correspondence with the first to fourth portions of the method.
Figure 5B:
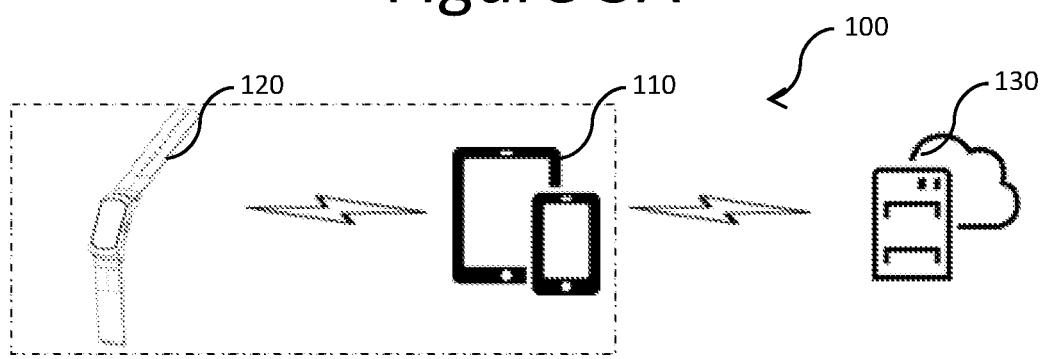
FIG. 5B illustrates the system of FIG. 1, with the computing device and the wearable device marked in correspondence with the fifth portion of the method.
Figure 5C:
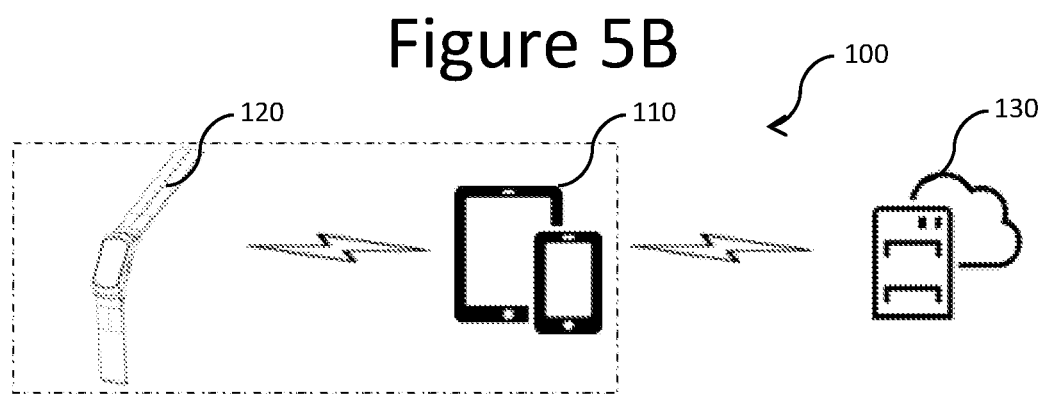
FIG. 5C illustrates the system of FIG. 1, with the computing device and the wearable device marked in correspondence with the sixth portion of the method.

FIGS. 5A to 5C show different stages of the method performed by the system 100. The portions of FIGS. 2A, 2B, 2C and 3A involve the first user device 110 and the server device 130, as illustrated in FIG. 5A, for creation and retrieval of a user pairing identifier. The portion of FIG. 3B involves the first user device 110 and the second user device 120, as illustrated in FIG. 5B, for device-device pairing/bonding. The portion of FIG. 3C(1) and that of FIG. 3C(2)

involve the first user device 110 and the second user device 120, as illustrated in FIG. 5C, for user-device pairing.

Accordingly, FIG. 2A(1) shows the first portion 210 of the method. Communication between the first user device 110 and the server device 130 during the first portion 210 in a B2C context is depicted in FIG. 5A.

At step 211, the first user device 110 launches a software application for communication with the server device 130. In this embodiment, the software application is also used for pairing/bonding of the second user device 120 and is pre-installed on the first user device 110. In other embodiments, a different software application may be used for pairing/bonding of the second user device, and the software application may not be pre-installed. The launched software application shows a login button for user interaction.

In this embodiment, operations of the first user device 110 in the context of the method are performed as a result of running the software application, unless otherwise stated. For example, where the first user device 110 is described to send a signal, to receive a signal, to receive a user input or to present information (e.g., to display the information through a screen or image projection), it means that the software application running on the first user device 110, either in response to user input or on its own, is causing the first user device 110 to perform the stated function. Likewise, operations of each of the second user device 120 and the server device 130 in the context of the method are performed as a result of running respective software applications, unless otherwise stated.

At step 212, the first user device 110 is responsive to a user input corresponding to the login button to provide (i.e., to send) a signal for user login (i.e., representing a login request) to the server device 130 via a network (e.g., the Internet, not shown). In response, the server device 130 provides relevant data to the first user device 110 via the network for rendering an application landing page for presentation (e.g., display) on the first user device 110.

At step 213, the first user device 110 renders the received relevant data into the application landing page. The relevant data in this embodiment is for rendering a webpage (or a web view) so that any user input data (including login information or user authentication information such as usernames and/or passwords) is not stored locally on the first user device and is instead provided to the server device 130 via the network. In such a manner, any other unrelated software applications installed on the first user device 110 are unable to access the user input data, providing better security. Thereafter, further user interactions with the software application may be rendered similar in the form of webpages (may also be referred to below as "web-based interface") based on relevant data provided by the server device 130.

In this scenario, the user is a new user and does not have an account.

At step 214, the first user device 110 is responsive to a user input with respect to the rendered webpage to provide a signal for account creation to the server device 130 via the network. In response, the server device 130 provides relevant data to the first user device 110 via the network for rendering on the first user device 110 another web-based interface for input of registration information by the user.

At step 215, the first user device 110 receives, via the rendered web-based interface of step 214, a user input representing an email address and provides, via the network, a signal including the email address to the server device 130.

At step 216, the server device 130, in response to the signal of step 215, causes an email including a URL for account activation (confirmation of the email address) to be sent to the email address. This step results in an entity being created in a database of the server device 130 for the user.

FIG. 2A(2) shows another first portion 210' alternative to the first portion 210 of FIG. 2A(1). This alternative first portion 210' in a B2B context does not involve the first user device 110.

At step 211', the server device 130 grants access to an administrator who logs in via an associated Web Portal Console.

At step 212', the server device 130 receives an input via the Web Portal Console from the administrator to create the entity in the database of the server device 130 for the user of the first user device 110, including identifying a user group for registering the user.

At step 213', the server device 130 receives another input from the administrator, representing an email address of the user.

At step 214', the server device 130, in response to the signal of step 213', causes the email including the URL for account activation (confirmation of the email address) to be sent to the email address. This step results in the entity being created in a database of the server device 130 for the user.

Figure 2B:
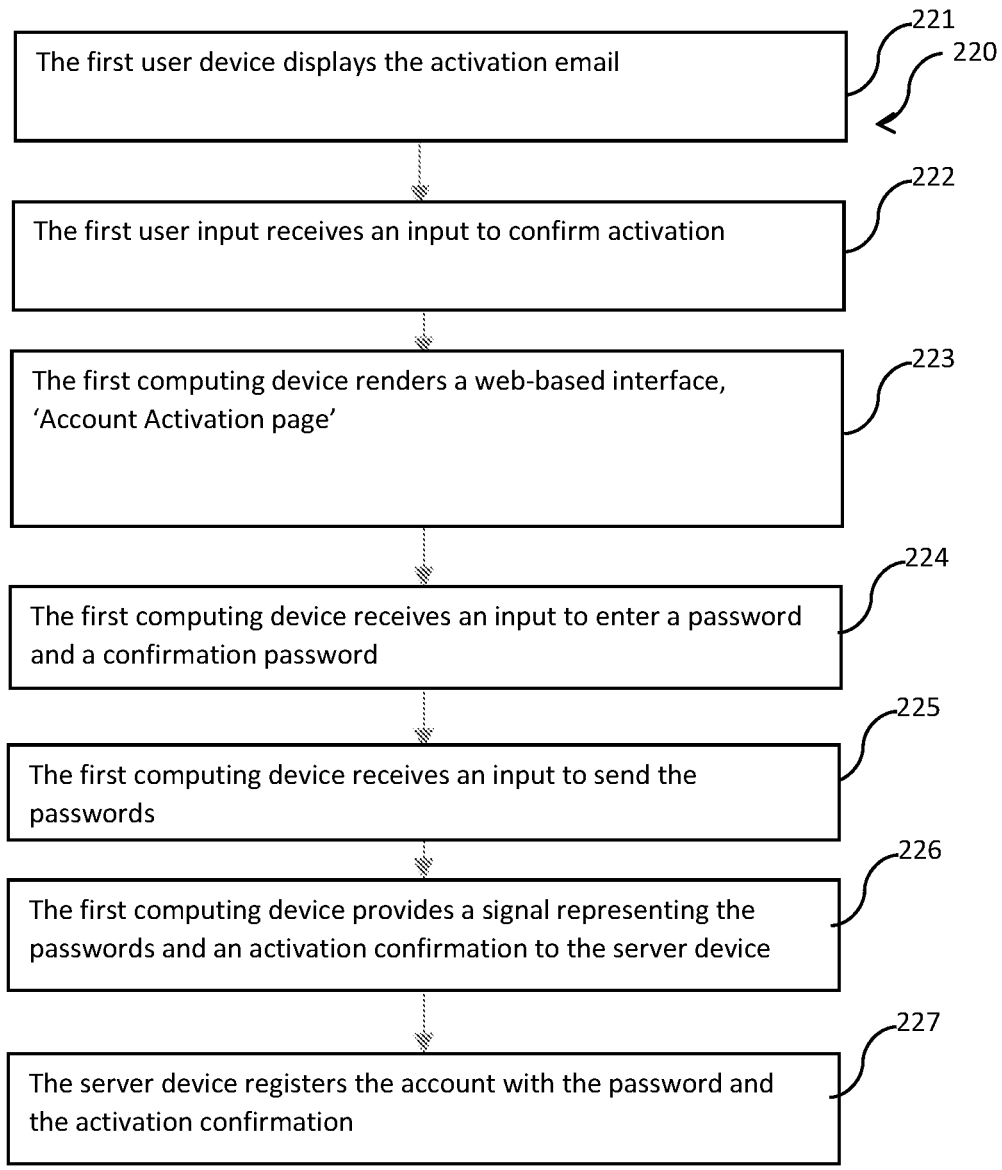
FIG. 2B illustrates a second portion of the method performed by the system of FIG. 1, following the first portion of FIG. 2A(1) or FIG. 2A(2), for the activation of the created user account by the user.

Following the first portion 210, 210', the method continues at the second portion 220 for account activation and password creation, as shown in FIG. 2B. The second portion 220 may be performed by the server device 130 and any computing device able to access the email account of the user and to communicate with the server device 130. The computing device is the first user device 110 in this embodiment, and may be another computing device in other embodiments. Communication between the first user device 110 and the server device 130 during the second portion 220 is depicted in FIG. 5A.

At step 221, the first user device 110 displays the activation email. The received activation email of this embodiment contains or embeds a visual confirmation button clickable to access the URL, for the user to decide whether to continue with the activation of the account.

At step 222, the first user device 110 receives a user input to open the URL in the email. As a result, the email address of the user is activated and registered. The user provides the input if the email is considered or verified by the user to be authentic.

At step 223, the first user device 110 receives data from the server device 130 for rendering a web-based interface for input of further registration information. This web-based interface is referred to herein as the "Account Activation page".

At step 224, the first user device 110 receives a user input to enter a password and a confirmation password for the account.

At step 225, the first user device 110 receives a user input to send the passwords, and, at step 226, provides (i.e., sends) a signal representing the passwords and an activation confirmation to the server device 130 via the network if the passwords match.

At step 227, the server device 130 is responsive to the signal of step 225 to cause the account to be registered with the password, and to cause a webpage to be shown on the first user device 110 for confirming the activation.

Figure 2C:
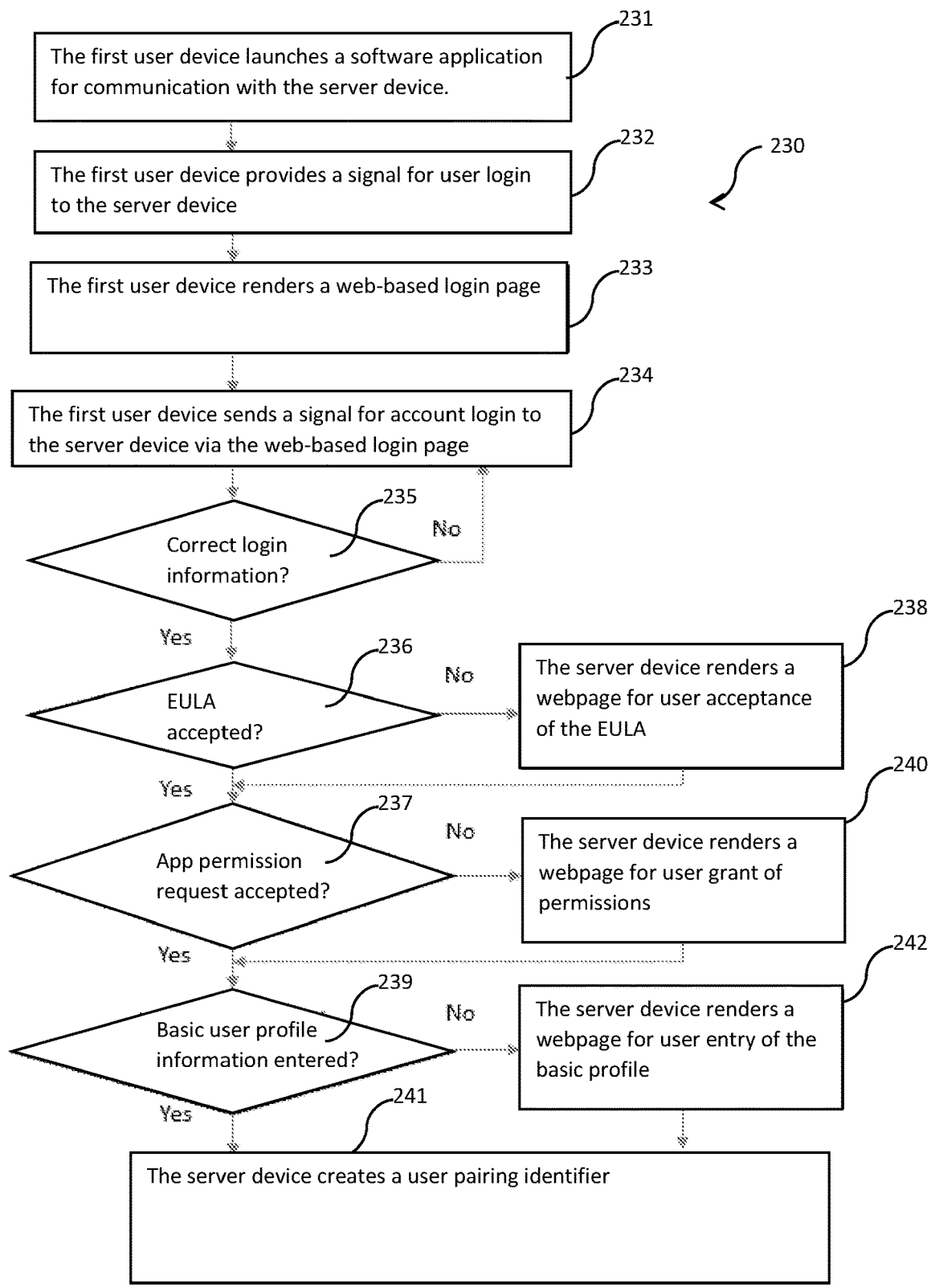
FIG. 2C illustrates a third portion of the method performed by the system of FIG. 1, following the portion of FIG. 2B, for the creation of a user pairing identifier by the server device in association with the created and activated user account.

Following the second portion 220, the method continues at the third portion 230 for the creation of a user pairing identifier, as shown in FIG. 2C. The third portion 230 may be performed by the server device 130 and any computing device able to communicate with the server device 130. The computing device is the first user device 110 in this embodiment, and may be another computing device in other embodiments. Communication between the first user device 110 and the server device 130 during the third portion 230 is depicted in FIG. 5A.

Steps 231 to 233 are similar to step 211 to 213, respectively, and are not described herein for the sake of brevity.

At step 234, the first user device 110 is responsive to a user input with respect to the rendered webpage to provide a signal for account login to the server device 130 via the network. The signal representing the registered email and the registered password.

At step 235, the server device 130 checks whether the login information (i.e., the registered email and the entered password) is correct, proceeds to step 236 if affirmative, and prompts the user for another attempt and returns to step 234 if otherwise.

At step 236, 237 and 239, the server device 130 checks whether the user has accepted an end-user license agreement (EULA), granted permissions for the software application, and provided basic user profile information, respectively. If affirmative, the server device 130 proceeds to step 241 to create a user pairing identifier for the user. If otherwise, the server device 130 causes the first user device 110 to render a web-based interface for guiding the user to comply with one or more of the EULA (step 238), software application permissions (step 240), and basic user profile information (step 242). In this embodiment, the EULA provides the user with an understanding of the types of form and disclosure of information. The permissions relate to controlling a Bluetooth module of the first user device 110. The basic user profile information relate to name, weight, height, etc., and are stored on the server device 130. Furthermore, the first computing device 110 of this embodiment is configured to not store the basic user profile information locally and to access the same in the form of a web-based interface (e.g., by way of HTML codes) provided by the server device 130. This alleviates or solves the problem of unauthorized access to such sensitive information stored on the first user device 110.

The user pairing identifier in this embodiment takes the form of a unique combination of numbers, alphabets, characters, etc. The unique combination has a length of eight (e.g. "1w3:8m8d", "8n6!H58d", etc.). The user pairing identifier in another embodiment includes a unique combination of at least one of a number, an alphabet, and/or a character. Other configurations of the user pairing identifier may be adopted in other embodiments. The user pairing identification is unique and corresponds to the user. Further, in this embodiment, the user pairing identifier is generated independent of the user devices 110, 120.

The user pairing identifier, the registered email address, the registered password and the basic user profile information together form a user profile of the user. Other relevant information of the user may also form part of the corresponding user profile.

Figure 3A:
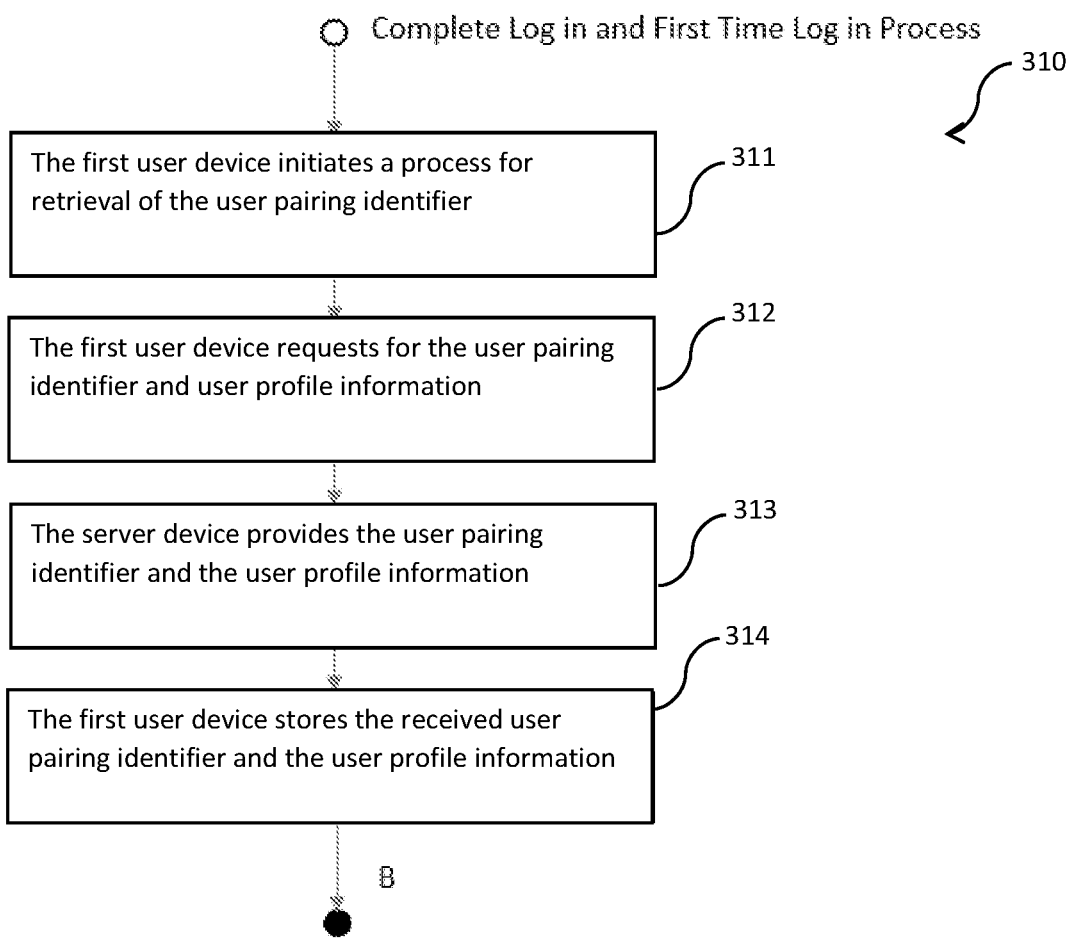
FIG. 3A illustrates a fourth portion of the method performed by the system of FIG. 1, following the portion of FIG. 2C, for provision of the created user pairing identifier by the server device to the computing device.

Following the third portion 230, the method continues at the fourth portion 310 for retrieval of the user pairing identifier from the server device 130 by the first user device 110, as shown in FIG. 3A. Communication between the first user device 110 and the server device 130 during the fourth portion 310 is depicted in FIG. 5A.

Figure 3B:
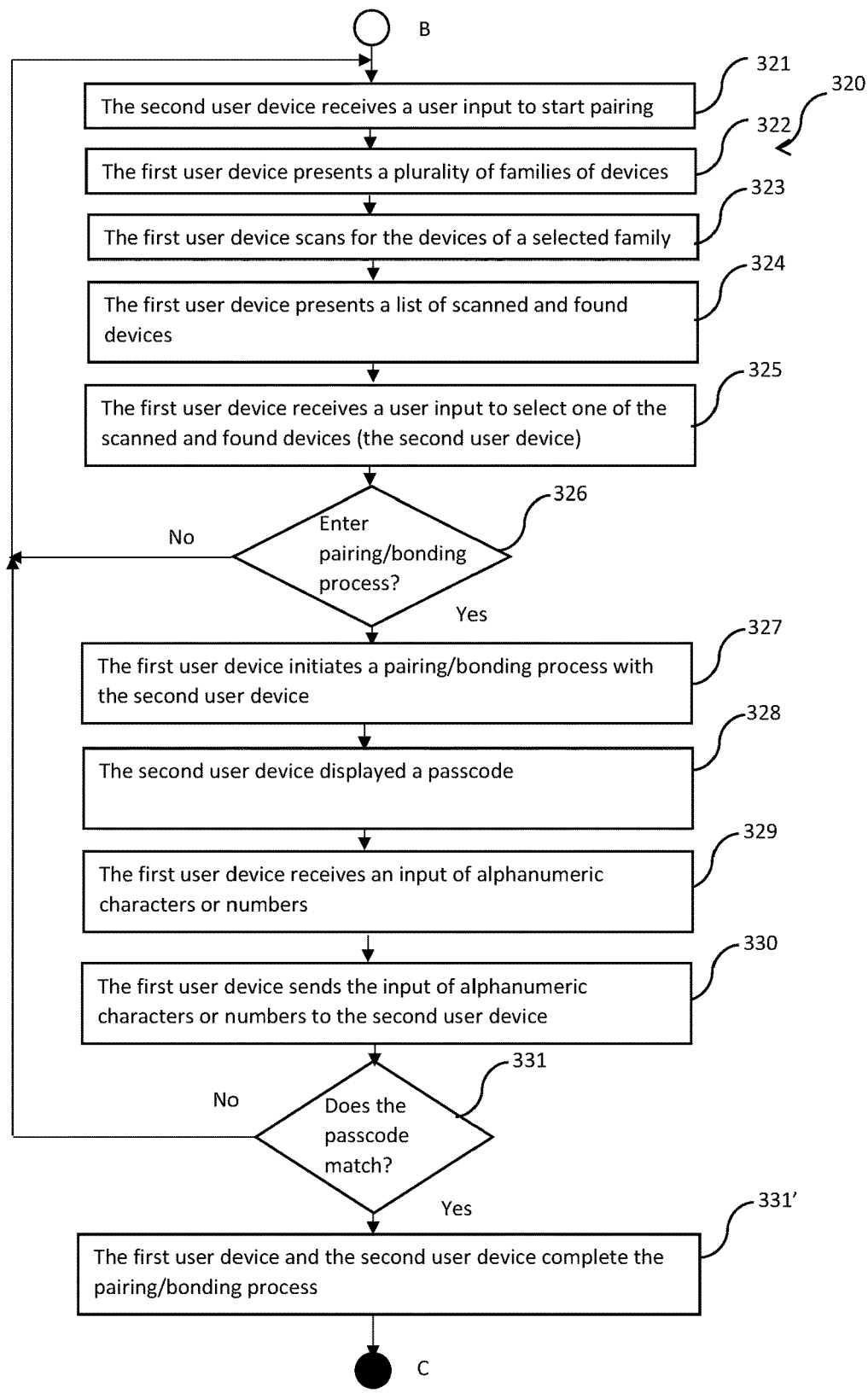
FIG. 3B illustrates a fifth portion of the method performed by the system of FIG. 1, following the portion of FIG. 3A, for a process of device-device pairing of the computing device with the wearable device.

At step 311, the first user device 110 is responsive to a user input by the user to initiate a process for retrieval of the corresponding user pairing identifier in preparation of pairing/bonding with the second user device 120 (in FIG. 3B).

At step 312, the first user device 110 sends a signal to the server device 130 via the network to request the corresponding user pairing identifier. In another embodiment, the signal further serves to request the basic user profile information of the user. The basic user profile information in this embodiment includes weight, height, age, gender name, email and date of birth. In other embodiments, the basic user profile information may include some or all of the above information types, as well as other information types. Some or all of such information may be made available for presentation on one or both of the user devices 110, 120 for user confirmation in any subsequent steps.

At step 313, the server device 130, in response to the signal of step 312, provides the user pairing identifier and the basic user profile information to the first user device 110 via the network.

At step 314, the first user device 110 stores the received user pairing identifier and the received user profile information. Alternatively, if the first user device 110 is configured to access the server device 130 for such information on demand and to not store the received information locally, such a configuration is useful for preventing or alleviating theft of sensitive data. It should be noted that, in an alternative embodiment, the user pairing identifier may be generated by another device instead of by the server device 130, and the first user device 110 may receive said user pairing identifier from said another device directly or via, for example, the server device 130.

Following the fourth portion 310, the method continues at the fifth portion 320 for device-device pairing/bonding of the first user device 110 with the second user device 120, as shown in FIG. 3B. Communication between the first user device 110 and the second user device 120 during the fifth portion 320 is depicted in FIG. 5B.

At step 321, the second user device 120, more particularly the software application running on the first user device 110, receives a user input to start pairing/bonding. That is, the second user device 120 is responsive to the user input to enter a pairing/bonding mode.

At step 322, the first user device 110, more particularly the software application running on the first user device 110, presents a plurality of families of devices that can be paired with the first user device 110. In this embodiment, the software application installed on the first user device 110 is preconfigured with the families of devices. Further, availability of the families for selection by the user may depend on a subscription level of the user.

At step 323, the first user device 110 receives a user input to select one of the families, and scans for the devices in the selected family. In this scenario, the user provides an input to select one of the families that corresponds to the second user device 120.

At step 324, the first user device 110 presents a list of scanned and found devices. In this scenario, the second user device 120 is included in the list presented to the user.

At step 325, the first user device 110 receives a user input to select one of the scanned and found devices. In this scenario, the selected device is the second user device 120 in the pairing/bonding mode.

At step 326, the first user device 110 prompts the user to provide an input to pair/bond the first user device 110 with the second user device 120. If the user provides the input to pair/bond, the first user device 110 proceeds to step 327. If the user provides an input to cancel or does not provide an input within a predetermined timeout period, the first user device 110 prompts the user to try again and returns to step 321. The pairing/bonding process may alternatively terminate upon timeout at step 326. A similar timeout operation may occur at step 331. In this embodiment, the first user device 110 prompts the user at step 326 by showing a relevant notification or message.

At step 327, the first user device 110 is responsive to the input to pair/bond to initiate a pairing/bonding process with the second user device 120 by sending a corresponding signal to the second user device 120.

At step 328, the second user device 120 is responsive to the signal of step 327 to display a random passcode of alphanumeric characters and numbers.

At step 329, the first user device 110 receives a user input of alphanumeric characters and numbers.

At step 330, the first user device 110 sends a signal representing the user input of step 329 to the second user device 120.

At step 331, the second user device 120 compares the received user input of alphanumeric characters and numbers with the passcode displayed by the second user device 120, proceeds to step 331' if they match, and returns to step 321 (or any suitable earlier step) for another attempt if they do not match. Alternatively, if they do not match, the process may terminate instead of returning to step 321. In another embodiment, at step 331, the second user device 120 renders an indication (e.g., audio and/or visual indication) to prompt user verification and confirmation of the received user input of alphanumeric characters and numbers and the displayed passcode. This serves to inform that a device-device pairing attempt is being made, whether by the user of the first user device 110 or otherwise. If the attempt is being made by an unauthorized party, the user of the first user device 110 thus made aware of the attempt may stop the pairing process at the second user device 120.

Figure 7:
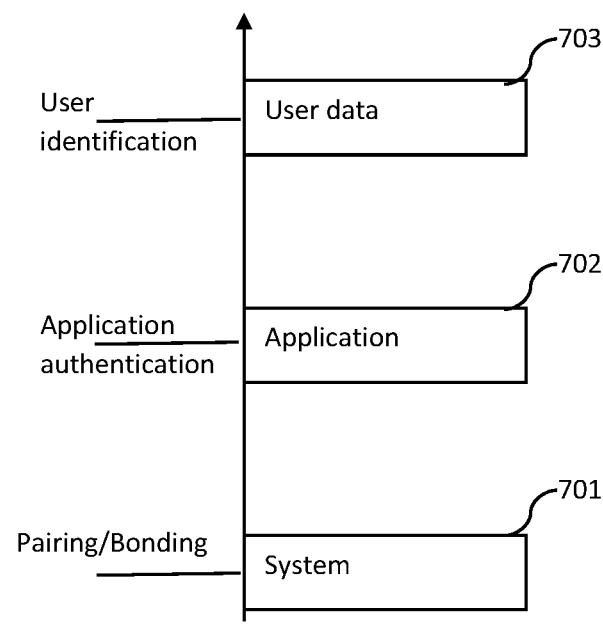
FIG. 7 is an illustration of different relationships established between the computing device and the wearable device of FIG. 1 at different stages of the fifth and sixth portions of the method.

At step 331', the first user device 110 and the second user device 120 complete the pairing/bonding process, which may be considered a device-based pairing process or a device-device pairing process. That is, such a pairing process is not dependent on the user pairing identifier. Upon completion of step 331', the devices 110 are now paired/bonded on a system level (see FIG. 7, item 701).

Following the fifth portion 320, the method continues at the sixth portion 332 for user-device pairing of the second user device 120 with the user profile of the user by way of the corresponding user pairing identifier, as shown in FIG. 3C(1). Communication between the first user device 110 and the second user device 120 during the sixth portion 332 is depicted in FIG. 5C.

At step 333, the first user device 110 and the second user device 120, which are now paired and bonded, establish a secure channel for communication between the two devices 110, 120 in the subsequent steps. In this embodiment, this is achieved through the use of at least one security layer of the software application, and occurs automatically when the two devices 110, 120 come into a range of communication.

Figure 4:
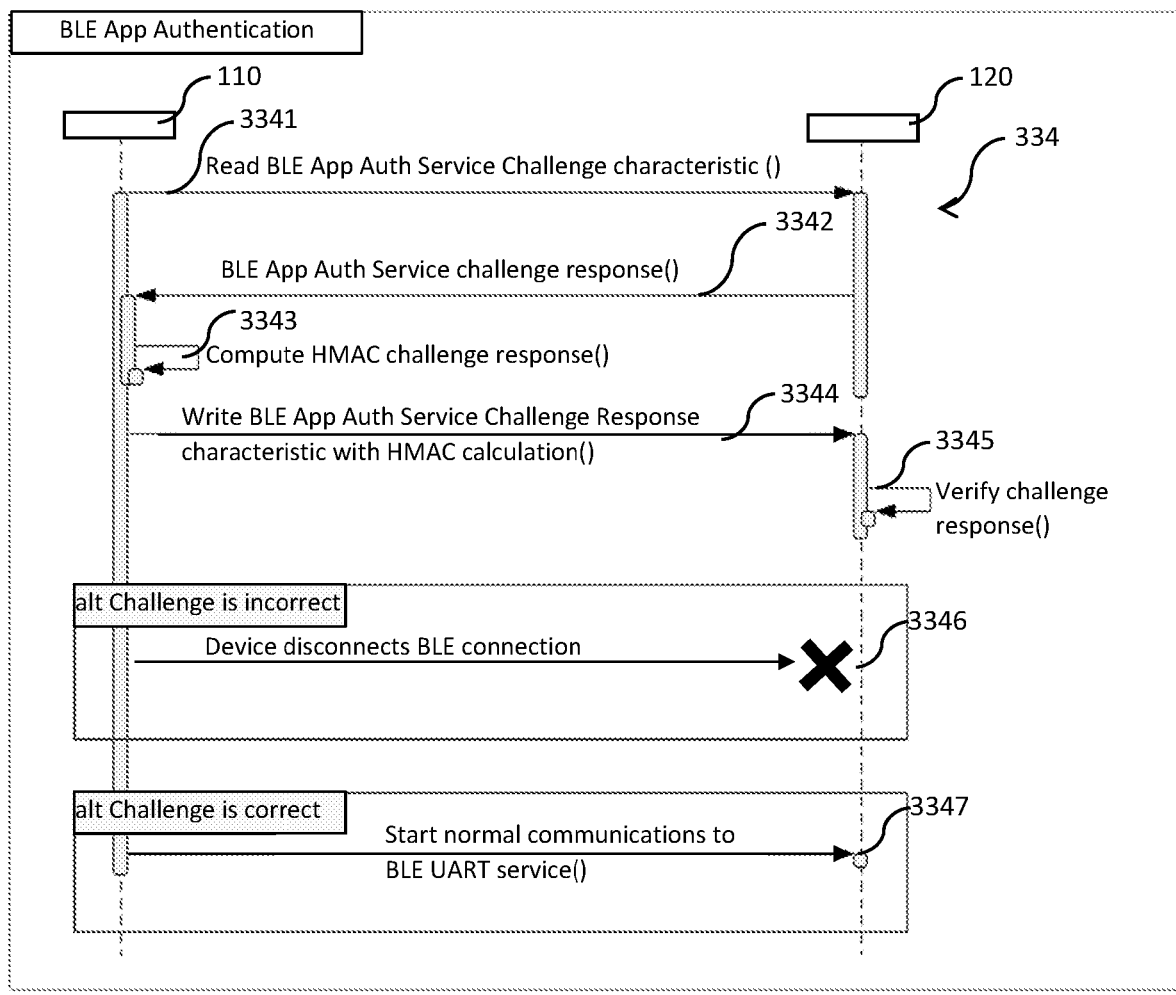
FIG. 4 illustrates an authentication protocol sequence of events forming part of the portion of FIG. 3C(1) or FIG. 3C(2), according to an example embodiment.

At step 334, the devices 110, 120 perform an application-level (or application-based) authentication process with each other, as depicted in FIG. 4, over the secure channel. The purpose of this application-level authentication process is to ensure that the second user device 120 communicates only with a trusted or official software application installed on the paired first user device 110. Step 334 includes sub-steps 3341 to 3347, and may be considered to constitute a "BLE application authentication protocol", performed each time the secure channel is established at step 333. In performing step 334, the second user device 120 challenges the first user device 110 and may thus be referred to as a "challenging computing device". The first user device 110 is challenged by the second user device 120 and may thus be referred to as a "responding computing device".

At sub-step 3341, the first user device 110 sends a request to the second user device for an authentication challenge.

At sub-step 3342, the second user device 120 generates a random number and sends the generated random number together with a key identifier (e.g., a key ID number) as the authentication challenge to the first user device 110.

At sub-step 3343, in response to the authentication challenge, the first user device 110 computes a response hash-based message authentication code (HMAC) value for the random number using one of a plurality of pre-shared keys stored on the first user device 110 and corresponding to the key identifier. In this embodiment, the pre-shared keys are pre-generated (e.g., during firmware or other development) and included in the trusted software application.

At sub-step 3344, the first user device 110 sends the computed response HMAC value to the second user device 120 as a response to the authentication challenge.

At sub-step 3345, the second user device 120 verifies the response HMAC value computed by the first user device 110. In particular, the second user device 120 computes a verification HMAC value with the same random number and one of a plurality of pre-shared keys stored on the second user device 120 and corresponding to the key identifier. In this embodiment, the pre-shared keys are pre-generated (e.g., during firmware or other development) and included in the second user device 120. In the present embodiment, the pre-shared keys stored on each of the first user device 110 and the second user device 120 are public keys of public-private key pairs pre-generated during, for example, development. However, in other embodiments, the pre-shared keys may be otherwise provided to the first user device 110 and the second user device 120.

Next, the second user device 120 controls its own communication with the first user device 110 based on a result of comparison of the response and verification HMAC values.

At sub-step 3346, the second user device 120 disconnects (or is controlled to disconnect) the secure connection with the first user device 110 if the result of comparison indicates that the response and verification HMAC values do not match. This stops all communications with the first user device 110 and is indicated in FIG. 4 by the cross and the lack of a small box representing the second user device 120 at step 3346. In an alternative arrangement, at sub-step 3346, the second user device 120 disregards (or is controlled to disregard) communication from the first user device 110 if the result of comparison indicates that the response and verification HMAC values do not match.

Following disconnection of the secure connection at sub-step 3346, the first user device 110, which is now device-device paired with the second user device 120, may be operated by the user to repeat step 333 followed by step 334 for another HMAC authentication attempt. In each new attempt of step 334, a new random number is generated by the second user device 120 and transmitted to the first user device 110 at sub-step 3342. In this embodiment, the new random number is transmitted to the first user device 110 with the same key identifier. In a different embodiment, a different key identifier may be sent with the new random number.

At sub-step 3347, the second user device 120 starts (or is controlled to start) normal BLE UART service communications with the first user device 110 if the result of comparison indicates that the response and verification HMAC values match. The second user device 120 is thus permitted to communicate with the first user device 110 over the secure channel in subsequent steps. This is indicated by a small box representing the second user device 120 and the lack of a cross at step 3347. At sub-step 3347, the software application installed on the first user device 110 is successfully authenticated by the second user device 120 for subsequent steps. Sub-step 3347 is followed by step 335.

Upon completion of step 334 at sub-step 3347, the user devices 110, 120 can be considered to be paired/bonded on an application level (see FIG. 7, item 702) and subsequent communication (including communication of any pairing identifier and device information between the devices 110, 120) is enabled.

At step 335, the first user device 110 requests the second user device 120 for a current pairing identifier of the second user device 120. More particularly, the first user device 110 sends to the second user device 120 via the secure channel a signal representing the request for the current pairing identifier.

At step 336, the second user device 120 sends the current pairing identifier to the first user device 110. More particular, the second user device 120 sends to the first user device 110 via the secure channel a signal representing the current pairing identifier.

At step 337, the first user device 110 sends the user pairing identifier to the second user device 120. More particularly, the first user device 110 sends to the second user device 120 via the secure channel a signal representing the user pairing identifier.

At step 338, the second user device 120 replaces the current pairing identifier with the user pairing identifier received from the first user device 110.

At step 339, the first user device 110 determines if the current pairing identifier received by the first user device 110 is a default pairing identifier (e.g., a default factory pairing identifier). That is to say, the trusted software application installed on the first user device 110 is preconfigured to recognise the default pairing identifier. This may be achieved by configuring the software application with the default pairing identifier for use at step 339. The default pairing identifier may have any length. For example, the default pairing identifier may have a length of four (e.g., "zzzz"), six ("xxxxxx") or eight ("yyyyyyyy"). There may be more than one default pairing identifier.

If a result of determination at step 339 is affirmative (i.e., the current pairing identifier is a default pairing identifier, meaning that the second user device 120 does not currently store any user related data such as physiological measurement data or packs of data), the first user device 110 proceeds to step 340.

If the result of determination at step 339 is negative, the first user device 110 proceeds to step 339' to determine whether the current pairing identifier received by the first user device 110 matches the user pairing identifier. If a result of determination at step 339' is affirmative (i.e., indicating that the second user device 120 currently stores user related data belonging to the user of the user pairing identifier), the first user proceeds to step 340. If the result of determination at step 339' is negative (i.e., indicating that the second user device 120 currently stores user related data belonging to a different user), the first user device 110 proceeds to step 339" to cause the second user device 120 to delete (e.g., erase or remove) the user related data on the second user device 120, such as the physiological measurement data, and then proceeds to step 340. More particularly, at step 339", the first user device 110 sends a signal to the second user device 120 to cause the second user device 120 to erase the user related data. Such a data deletion operation does not affect the pairing/bonding relation established through the steps of FIG. 3B, nor does it affect the result of the application-level authentication process of step 334. Step 339" prevents user related data stored on the second user device 120 in association with one user from being transmitted to a paired device of another user. In an alternative embodiment, step 340 may be omitted. In an alternative embodiment, the second user device 120 is configured to, in response to the user pairing identifier received from the first user device 110 at step 337, delete user related data stored on the second user device 120 if the received user pairing identifier is different from the current pairing identifier. Following the deletion, the second user device 120 performs step 338 to replace the current pairing identifier with the received user pairing identifier, and steps 339-339" may be omitted.

At step 340, the first user device 110 sends device information (including a serial number and any other relevant data) of the second user device 120 via the network to the server device 130 for association with the user profile, more particularly for storage at the server device 130 in association with the user profile. This completes the user-device pairing process. The serial number may be previously received by the first user device 110 from the second user device 120 at any suitable step (e.g., at step 336, sent by the second user device 120 in association with the current pairing identifier to the first user device 110). Alternatively, the device information of the second user device 120 may be otherwise provided to the server device 130 by any other suitable means.

At step 341, the first user device 110 and the second user device 120 complete the user-based pairing process. Upon completion of portion 332 at step 341, the user devices 110, 120 can be considered to be paired on a user level (see FIG. 7, item 703).

After completion of the user-based pairing process of FIG. 3C(1), data such as user-related data may be communicated by the first user device 110 from the second user device 120 via the first user device 110 to the server device 130. In this embodiment, the first user device 110 does not store such user related data received from the second user device 120, which prevents other untrusted software applications installed on the first user device 110 from gaining access to such user related data. However, in other embodiments, the first user device 110 may store temporarily such user related data for provision to the server device 130 when a connection to the server device 130 becomes available.

In this embodiment, for each authentication attempt at step 334, a new random number is generated by the second user device 120 at step 3342. The newly generated random number is then sent to the first user device 110 with the same or different key identifier. Alternatively, the first user device 110 may be configured to re-authenticate (i.e., at step 3344) following each secure channel establishment at step 333 through the use of the most recently available random number and the associated key identifier.

FIG. 3C(2) shows another sixth portion of the method alternative to that of FIG. 3C(1) and following the fifth portion of the method. The alternative sixth of portion FIG. 3C(2) differs from that of FIG. 3C(1) in the rearrangement of some of the steps. In the sixth portion of FIG. 3C(2), step 336 is followed by step 339. If the determination by the first user device 110 at step 339 is positive, the first user device 110 proceeds to step 337. If the determination by the first user device 110 at step 339 is negative, the first user device 110 proceeds to step 339'. If the determination by the first user device 110 at step 339' is positive, the first user device 110 proceeds to step 337. If the determination by the first user device 110 at step 339' is negative, the first user device 110 proceeds to step 339″ and then to step 337. The function of each of these rearranged steps are identical to those corresponding steps in FIG. 3C(1). Step 337 is then followed by steps 338, 340 and 341 in the given order.

The trusted software application may, in response to a user input, cause the first user device 110 and the second user device 120 to unpair in preparation of another user-based pairing or association operation. This may involve deleting or erasing any user related data stored on the second user device 120 and restoring the current pairing identifier of the second user device 120 to a default one.

It can be appreciated from the description of FIGS. 2 and 3 that the server 130 is configured to generate the user pairing identifier corresponding to the user profile, to provide the generated user pairing identifier for use by the first user device 110 of the user profile to pair the second user device 120 with the user profile, and to receive the device information of the second user device 120. A method performed by the server device 130 may thus comprise generating, using the server device 130, the user pairing identifier corresponding to the user profile; providing, using the server device 130, the generated user pairing identifier for use by the first user device 110 of the user profile to pair the second user device 120 with the user profile; and receiving, using the server device 130, device information of the second user device 120.

It can also be appreciated that the first user device 110 is configured to use the associated user pairing identifier to pair the second user device 120 with the user profile of the user pairing identifier, the user pairing identifier being generated by the server device 130. A method performed by the first user device 110 may thus comprise using, by the first user device 110, the associated user pairing identifier to pair the second user device 120 with the user profile of the user pairing identifier, the user pairing identifier being generated by the server device 130. In this example, the user pairing identifier is generated independent of the user devices 110, 120

According to another embodiment, pairing (device-device, illustrated in FIG. 3B, or user-device, illustrated in FIG. 3B) by the first user device 110 may be dependent on at least one of a geographical location and time of the first user device 110. That is, such pairing may be enabled if the first user device 110 satisfies a predetermined condition relating to at least one of a geographic location and a time period. For example, the first user device 110 may be configured to be allowed to proceed from step 331 to step 332 if the first user device 110 is located within a range (e.g., 30 metres) from the server device 130 or from the second user device 120, and the system time is within the time period (e.g., 9 AM to 5 PM). The predetermined condition may also require the first user device 110 to be located within a specific geographical area determined by any suitable means (e.g., GPS). The first user device 110 may be configured to terminate the process if the conditions are not met. This ensures that the devices 110, 120 can be paired only at predetermined locations (either decided by the user or otherwise), for example where some form of security measure is implemented. Turning off this function, may facilitate use of the system by users without convenient access to the predetermined locations. Another example of predetermined condition to be satisfied by the first user device 110 for the purpose of device-device pairing (e.g., occurring before performance of the step 310) includes that, when the first user device 110 is operated to login from a different country within, for example, five minutes time, the user of the first user device 110 needs to confirm whether his or her login is correct.

Communication of the user pairing identifier or the default pairing identifier between the first user device 110 and the second user device 120 may be performed wirelessly or wiredly, or through a storage device.

The request sent by the first user device 110 to the second user device 120 at step 335 may also be a request for other device information of the second user device 120. In response to this request or at any other step, the second user device 120 may send such information to the first user device 110. Such other device information represents, for example, configuration of the second user device 120 (e.g., made by the user), and may relate to alarms, alerts, units, languages and time zones. As alluded to above, this request may also be a request for basic user profile information (weight, age, height, gender, etc.). In response to the request, the second user device 120 sends the requested information to the first user device 110, for example, at step 336. This will facilitate on-demand retrieval or checking of the user pairing identifier now stored in the second user device 120 by the user. Such retrieval of the other device and user information together with the user pairing identification from the second user device 120 for presentation on the first user device 110 allows the user of the first user device 110 to check whether the second user device 120 is currently associated to the user and, if not, with which user the second user device 120 is currently associated. In another embodiment, the pairing between the first user device 110 with the second user device 120 may only proceed on a one time basis so as to prevent any further accidental connection by the second user device 120 with another user device.

The steps of FIG. 3C(1) or those of FIG. 3C(2) are performed each time the paired/bonded devices 110, 120 come into a communication range. This authentication process is thus performed upon initiation of each new connection (e.g., BLE) between the devices 110, 120, prior to normal data communication. If the authentication process fails, the second user device 120 of one embodiment discards incoming packets or signals for BLE services received from the first user device 110, and/or returns no acknowledgement packets, at sub-step 3346. No acknowledgement packets occur when the BLE communication is disconnected, resulting in no communication.

The trusted software application running on the first user device 110 performs authentication with the second user device 120 at step 334 via the secure channel established at step 333. As can be appreciated from the above description, the purpose of step 334 (application-level authentication process) is to prevent the second user device 120 to communicate its user related data with untrusted software applications that may or may not be installed on the first user device 110. This is also useful in preventing the second user device 120 from being incorrectly configured, as a result of communication with an untrusted software application. Firmware of the second user device 120 may be updated by the trusted software application following a successful authentication at step 3347.

Prior to accessing data (e.g., configuration data or measurement data) on the second user device 120, the first user device 110 performs the authentication process at step 334. The authentication process of step 334 can be performed without any network access (e.g., the Internet) other than the secure channel. The authentication process may include at least one non-requirement pack (i.e., requiring no acknowledgement) of BLE services or at least one requirement pack (requiring acknowledgement) of BLE services. The at least one non-requirement pack of BLE services further includes a BLE current time service. The BLE current time service may be one where the wearable device (the second user device 120) is configured to communicate and retrieve a current time from the mobile device (the first user device 110) before going through the authentication protocol. The at least one non-requirement pack of BLE services may further include a bootloader mode DFU operation where neither pairing nor authentication is required to be performed. In the bootloader mode DFU, the first user device 110 can connect to the second user device 120 for upgrading (e.g., firmware). That is to say, the devices 110, 120 may support various BLE protocols such as CTS and DFU, where both CTS and DFU may not require any authentication process prior BLE communication using these two protocols. Authentication may not be required for CTS because, for some operating systems (such as the iOS platform of Apple Inc.), date and time service (including time synchronisation) is automatically updated and handled by the operating system itself. Authentication may not be required for DFU because DFU may not rely on application authentication service at all. DFU, as a secondary service, may often be activated by a communication between a software application and a device to be updated by the software application under a service called virtual serial port. The virtual serial port may be put behind the application authentication service which may be secure enough before starting DFU process.

Moreover, the at least one requirement pack of BLE services may be configured for normal application level data transfer and wearable device configuration. Additionally, the at least one requirement pack of BLE services may include a secure DFU for upgrading. By doing so, the firmware of the second user device 120 may be configured for upgrades.

For clarification, "pairing" as used herein, in the context of device-device pairing, is a process that starts with connection and ends with disconnection. "Bonding" as used herein a part of the pairing process. FIG. 3A shows a process for retrieving data including the user pairing identifier from the server device 130 by the first user device 110. FIG. 3B shows a process for selecting and pairing the second user device 120 with the first user device 110. As part of the pairing process, the first and second user devices 110, 120 are "bonded" by remembering a long term encryption/decryption key. Each of FIG. 3C(1) and FIG. 3C(2) is a process for associating (e.g., user-device pairing) the second user device 120 with the user profile by way of the corresponding user pairing identifier. After completion of the above processes, disconnection may take place.

That is to say, the bonding process forming part of the process of FIG. 3B can be optionally performed to enable secure communication and optionally resides in the pairing (device-device pairing) process. The 'bonding operation' is a process for remembering already paired devices to which the first user device 110 will be connected in the future without the need for another pairing process. Thus, with reference to FIG. 3B, the bonding process occurs after the passcode is matched, indicating that the device is the right device with which to connect and to establish a bonding relationship by creating a long term key for future communication without needing to be paired again. The user device accordingly "remembers" or bonds with the device. In other words, the bonding process is where a long term key is exchanged for future links between the devices so that the pairing process does not have to be repeated for the future links.

In an alternative embodiment, the pairing and bonding processes as described above in the context of FIG. 3B may be reversed.

Thus, disclosed in one aspect is a first process, a second process and a third process. The first process is where a user device(s) is each connectable to a server, paired with the server (or a cloud service) to retrieve pairing identification to the user device. A second process includes a first sub-process where the user device is paired with another device and connected and recognised, and a second sub-process where the user device bonds with and remembers the device. The third process is where the user device communicates with the device for exchanging of user information and user pairing identification. In an instance the device can be one of wearable or non-wearable device.

Figure 6:
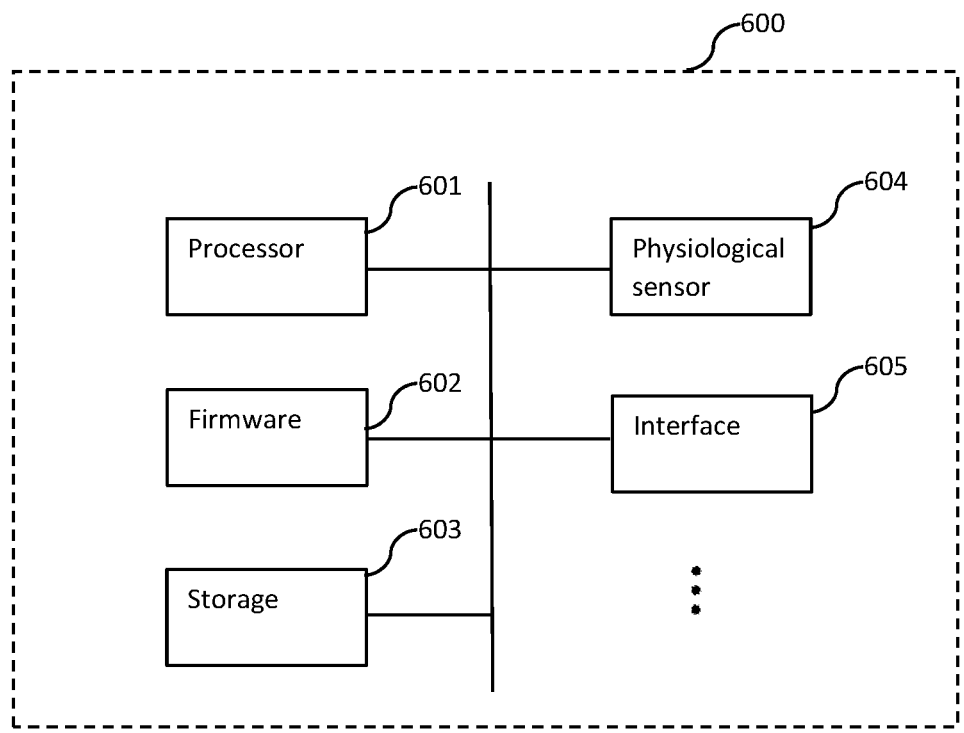
FIG. 6 illustrates an example system block diagram of a computing device according to one embodiment of the present disclosure.

FIG. 6 shows a system block diagram of an exemplary computing device 600, which may embody individually one or more of the devices 110-130. The computing device 600 includes a processor 601, a firmware chip 602, a storage device 603, a physiological sensor 604 (e.g., an electrocardiogram sensor, a photoplethysmogram sensor or a combination thereof) and a communication interface 605 (wired or wireless) operatively associated with the processor 601. It is worth noting that any type of sensor capable of physiological measurement can be used. The computing device 600 of the second user device 120 takes on the form of a miniature device (e.g., a wearable device). The computing device 600 of the server device 130 takes on the form of a computer. The computing device 600 of the first user device 110 takes on the form of a mobile device or pad. Instructions, such as those of the portions 210, 220, 230, 310, 320 and 332 executable by the processor 601 may be stored in the firmware chip 602, the storage device 603 or a combination thereof.

Other alternative embodiments and arrangements are described below.

In one embodiment, at least one of the user devices 110, 120 is configured with a timeout feature, whereby if a predetermined time interval passes at any of the steps of FIGS. 2B and 2C, the at least one of the user devices 110, 120 terminates the process. This feature is especially useful in saving power, especially in the event of incorrect communication cycles (i.e., when the devices 110, 120 cannot establish a connection with each other). More particularly, the power consumption of the at least one devices 110, 120 in pairing mode is increased due to the need to scan and/or broadcast wireless signals. By implementing the timeout feature, power consumption can be greatly reduced in the event of incorrect communication cycles. For instance, if two devices operate in a pairing mode and one device is controlled by a user to exit the pairing mode, the other device without the timeout feature will remain in the pairing mode and the power consumption will be excessive.

According to an embodiment of another aspect, the first user device 110 is configured to use the associated user pairing identifier to pair the second user device 120 with the user profile of the user pairing identifier, the user pairing identifier being generated independent of the user devices 110, 120.

The first user device 110 may be connected to the Internet through any suitable connection, e.g., WiFi, Wired Connection or Bluetooth (via an already paired-bonded data routing device, such as a portable hotspot device). This connection allows the application to retrieve the user pairing identification from the server device 130. Other suitable communication protocols of, e.g., personal area network (PAN), local area network (LAN) and wide area network (WAN), may be used by the first user device 110 for data communication with the server device 130.

In one use case, the first user device 110 is paired with multiple second user devices 120. In another use case, multiple first user devices 110 are paired with respective multiple second user devices 120.

For the purpose of interaction with the user via the web-based interface, the server device 130 may be configured with a time-out period of, for example, up to 600 seconds for added security.

In one arrangement, the first user device 110 may be paired with more than one second user devices 120 in the manner of FIGS. 3B and 3C, and may forward data received from the paired second user devices 120, with or without data processing, to the server device 130. In another arrangement, multiple first user devices 110 may be paired with respective second user devices 120 in the manner of FIGS. 3B and 3C, and may forward data received from the respective second user devices 120, with or without data processing, to the server device 130. The software application may adopt any suitable form depending on the type of user device (e.g., a smartphone, a tablet, a laptop computer, a non-movable apparatus, etc.) on which the software application is installed.

In an alternative embodiment, once the first user device 110 sends the input of alphanumeric characters and numbers to the second user device 120 at step 330, the second user device 120 displays the received alphanumeric characters and numbers at step 331. This allows the user to compare the passcode generated by the second user device 120 with the alphanumeric characters and numbers received by the second user device 120, and to decide whether to provide an input to one or both of the devices 110, 120 to continue to step 331'. In the case of passcode mismatch, the second user device 120 may render a corresponding user perceivable indication (e.g., sound or light) to prompt the user to attempt step 321 and onwards again or to terminate.

The disclosed embodiments are advantageous. For example, with about the same amount of user interaction, a higher level of security can be achieved in comparison with existing arrangements. That is, a higher level of security can be achieved with a reduced level of operation complexity. Specifically, the steps of FIG. 3C(1) and those of FIG. 3C(2) do not require any user input and occurs automatically once a Bluetooth communication channel is established at step 333.

Moreover, the BLE application authentication protocol of step 334 ensures that the second user device 120 communicates only with the trusted or official software application installed on the first user device 110. This ensures device security. For example, the firmware of the second user device 120 can be updated only by a trusted (e.g., official) software application following successful authentication at step 334. In contrast, with known arrangements of user devices (e.g., a smartphone), once an untrusted software application on the smartphone is granted permission for Bluetooth access, the untrusted software application has unrestricted access to any Bluetooth device paired with the smartphone. This poses a security risk, especially if the untrusted software application is a malicious one.

In addition, the second user device 120 can be caused, based on whether the current pairing identifier is a non-default one different from the user pairing identifier, to erase user related data stored on the second user device 120. This is useful in preventing a wearable device from transmitting currently stored user related data to a paired and authenticated device (i.e., successful authentication at step 334) having the trusted software application and belonging to another user (i.e., non-matching user pairing identifier).

In another embodiment, the software application may be used to call each individual device to be installed only at a point of release from the server, meaning that each device being called to one mobile device to communicate indirectly through said one mobile device with the cloud server, or directly with the cloud server. This means that, in the example of FIG. 1, the second user device 120 may communicate directly with the server device 130 or indirectly with the same via the first user device 110.

One having ordinary skill in the art will recognise that one or more configuration characteristics of various combinations of methods for wireless communication through an application for authentication can be selected from in accordance to the desired requirements based on a factory setting predefined according to the needs.

While the present invention has been described and illustrated in its preferred form with a certain degree of particularity, those skilled in the art will readily appreciate that the present invention of the preferred form has been made only by way of example and that numerous changes or rearrangement or configurations in the details of constructing and the combination and arrangements of features or parts may be resorted without departing from the scope of the present invention. It is intended, therefore, that the present invention be defined by the scope of the exemplary embodiments that follow and that such exemplary embodiments be interpreted as broadly as is reasonably.

The invention claimed is:

1. A device pairing method comprising:
   generating, using a server, a user pairing identifier corresponding to a user profile;
   sending, from the server to a first user device of the user profile, the generated user pairing identifier for the first user device to send to a second user device to thereby pair the second user device with the user profile;
   receiving, by the server and from the first user device, device information of the second user device after sending the generated user pairing identifier from the server to the first user device, the device information sent from the second user device to the first user device; and
   associating, using the server, the received device information with the user profile to thereby complete the pairing of the second user device with the user profile.

2. The device pairing method of claim 1, further comprising:
   sending, using the first user device, the generated user pairing identifier to the second user device to replace a current pairing identifier of the second user device.

3. The device pairing method of claim 2, further comprising:
   sending, using the first user device, a signal to the second user device to cause the second user device to erase user related data of the second user device if the replaced current pairing identifier represents a non-default pairing identifier and is different from the user pairing identifier.

4. The device pairing method of claim 1, further comprising:
   enabling communication of the first user device with the second user device if the first user device satisfies a predetermined condition relating to at least one of a geographic location and a time period, the geographic location being a location of the first user device relative to a location of the server or being an absolute location of the first user device.

5. The device pairing method of claim 1, further comprising:
sending, using the second user device to the first user device, a random number and an associated key identifier,
receiving, using the second user device from the first user device, a response hash-based message authentication code (HMAC) value,
computing, using the second user device, a verification HMAC value with the random number and one of a plurality of cryptographic keys of the second user device identified by the key identifier, and
controlling, using the second user device, communication of the second user device with the first user device based on a result of comparison of the response and verification HMAC values.

6. The device pairing method of claim 5, wherein the second user device is controlled to disconnect an existing connection with the first user device if the result of comparison indicates that the response and verification HMAC values do not match.

7. The device pairing method of claim 5, wherein the second user device is controlled to disregard communication from the first user device if the result of comparison indicates that the response and verification HMAC values do not match.

8. The device pairing method of claim 5, further comprising:
generating, using the first user device, the response HMAC value with the random number and one of a plurality of cryptographic keys of the first user device identified by the key identifier.

9. The device pairing method of claim 5, further comprising:
generating, using the second user device, the random number.

10. The device pairing method of claim 1, wherein the generated user pairing identifier includes a unique combination of at least one of a number, an alphabet, and a character.

11. The device pairing method of claim 1, wherein the server sends the generated user pairing identifier through the Internet.

12. The device pairing method of claim 1, wherein the device information includes a serial number.

13. A device pairing method comprising:
sending, from a first user device of a user profile to a second user device, a user pairing identifier corresponding to the user profile and associated with the first user device;
the user pairing identifier sent from the first user device to the second user device for the second user device to replace a current pairing identifier of the second user device with the sent user pairing identifier to thereby pair the second user device with the user profile,
wherein the user pairing identifier is generated by a server and sent from the server to the first user device.

14. A device communication control method comprising:
sending, using a challenging computing device to a responding computing device, a random number and an associated key identifier;
receiving, using the challenging computing device from the responding computing device, a response hash-based message authentication code (HMAC) value;
computing, using the challenging computing device, a verification HMAC value with the random number and one of a plurality of cryptographic keys of the challenging computing device identified by the key identifier; and
controlling, using the challenging computing device, communication of the challenging computing device with the responding computing device based on a result of comparison of the response and verification HMAC values.

15. The device communication control method of claim 14, wherein the random number is different from that of a previous failed authentication attempt, and the associated key identifier is different from that of the previous failed authentication attempt.

16. A device pairing method comprising:
receiving, from a first user device of a user profile and by a second user device, a user pairing identifier corresponding to the user profile and associated with the first user device;
replacing, using the second user device, a current pairing identifier of the second user device with the received user pairing identifier; and
pairing, using the second device, the second user device with the user profile,
wherein the user pairing identifier is generated by a server and sent from the server to the first user device.

* * * * *